US012667926B2

(12) United States Patent
Tamogami

(10) Patent No.: US 12,667,926 B2
(45) Date of Patent: Jun. 30, 2026

(54) DICING APPARATUS AND METHOD FOR CONTROLLING DICING APPARATUS

(71) Applicant: TOKYO SEIMITSU CO., LTD., Hachioji (JP)

(72) Inventor: Takashi Tamogami, Hachioji (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 423 days.

(21) Appl. No.: 18/406,688

(22) Filed: Jan. 8, 2024

(65) Prior Publication Data

US 2024/0246187 A1     Jul. 25, 2024

(30) Foreign Application Priority Data

Jan. 23, 2023     (JP) ................................. 2023-008141

(51) Int. Cl.
*B23Q 17/09*          (2006.01)
*B23Q 17/20*          (2006.01)
*B23Q 17/24*          (2006.01)

(52) U.S. Cl.
CPC ......... *B23Q 17/0904* (2013.01); *B23Q 17/20* (2013.01); *B23Q 17/2471* (2013.01)

(58) Field of Classification Search
CPC ................ B23Q 17/0904; B23Q 17/20; B23Q 17/2471; H10P 54/00; H10P 72/0428; H10P 72/06; H10P 72/7402; H10P 74/203; B28D 5/045; B28D 5/0058; B28D 5/0064; B28D 5/0082; G01B 11/22; G01B 11/2441
See application file for complete search history.

(56) References Cited

U.S. PATENT DOCUMENTS

| | | | |
|---|---|---|---|
| 2001/0010571 A1* | 8/2001 | Kanou .............. | G02F 1/133553 349/138 |
| 2008/0093798 A1* | 4/2008 | Yoshizawa .......... | G07F 17/3211 273/146 |
| 2010/0129984 A1* | 5/2010 | Vakanas .............. | H10P 72/0428 219/121.67 |
| 2015/0179616 A1* | 6/2015 | Lin ........................ | H10W 90/00 257/773 |
| 2018/0308755 A1* | 10/2018 | Tabuchi .................. | H10P 54/00 |
| 2018/0342422 A1* | 11/2018 | Li ........................... | H10P 54/00 |
| 2019/0221479 A1* | 7/2019 | Okita ...................... | H10P 54/00 |

FOREIGN PATENT DOCUMENTS

| | | |
|---|---|---|
| JP | 2015-085397 A | 5/2015 |
| JP | 2015-099026 A | 5/2015 |
| JP | 2021-084201 A | 6/2021 |

* cited by examiner

*Primary Examiner* — Ziaul Karim

(74) *Attorney, Agent, or Firm* — PROCOPIO, CORY, HARGREAVES & SAVITCH LLP

(57)                    ABSTRACT

A dicing apparatus that performs dicing of a street of a workpiece attached to a dicing tape via a die attach film and cuts the workpiece and the die attach film along the street includes a cross-sectional profile acquisition unit that acquires a cross-sectional profile of a machined groove formed through the dicing, a cut amount detection unit that detects a cut amount into the die attach film obtained through the dicing on the basis of the cross-sectional profile acquired by the cross-sectional profile acquisition unit, and a division determination unit that determines whether or not the die attach film is in an undivided state on the basis of the cut amount detected by the cut amount detection unit.

6 Claims, 17 Drawing Sheets

| FILM THICKNESS | 10 μm | | 20 μm | | 40 μm | |
|---|---|---|---|---|---|---|
| TARGET VALUE OF CUT AMOUNT | 25 μm (DIVIDED STATE) | 5μm (UNDIVIDED STATE) | 35 μm (DIVIDED STATE) | 15μm (UNDIVIDED STATE) | 60 μm (DIVIDED STATE) | 35μm (UNDIVIDED STATE) |
| Avg. | 27.2 | 4.8 | 32.1 | 12.4 | 58.7 | 31.1 |
| Min. | 24.0 | 3.0 | 26.5 | 9.0 | 51.5 | 27.0 |
| Max. | 32.0 | 7.0 | 36.0 | 16.0 | 62.0 | 37.5 |
| 3δ | 7.0 | 2.9 | 9.1 | 6.3 | 7.2 | 7.8 |

DICING APPARATUS AND METHOD FOR CONTROLLING DICING APPARATUS

BACKGROUND OF THE INVENTION

Field of the Invention

The present invention relates to a dicing apparatus for dicing a street of a workpiece attached to a dicing tape via a die attach film, and a method for controlling the dicing apparatus. Priority is claimed on Japanese Patent Application No. 2023-008141, filed Jan. 23, 2023, the content of which is incorporated herein by reference.

Description of Related Art

A workpiece such as a semiconductor wafer is divided into a plurality of devices in a lattice pattern by lattice-like streets. Individual devices are manufactured by dividing this workpiece along the streets. A blade dicer is well known as a dicing apparatus that divides a workpiece into a plurality of devices (chips) (see Patent Document 1). A workpiece attached to a dicing tape via a die attach film is set on this blade dicer. Then, the blade dicer executes dicing (cutting) in which a machined groove is formed along the streets, that is, the workpiece and the die attach film are divided along the streets by a high-speed rotating blade while the high-speed rotating blade is moved relative to the workpiece.

The dicing apparatus of Patent Document 1 measures the shape of the machined groove by white interferometry using a white interference microscope. Further, in dicing apparatuses described in Patent Document 2 and Patent Document 3, the shape of a machined groove is measured using various three-dimensional shape measurement units such as a laser displacement meter or a confocal microscope in addition to a white interference microscope. As a result, it is possible to check the quality and positional accuracy of the machined groove.

PATENT DOCUMENTS

[Patent Document 1] Japanese Unexamined Patent Application, First Publication No. 2021-084201
[Patent Document 2] Japanese Unexamined Patent Application, First Publication No. 2015-085397
[Patent Document 3] Japanese Unexamined Patent Application, First Publication No. 2015-099026

SUMMARY OF THE INVENTION

The workpiece that has been diced by the dicing apparatus described in Patent Document 1 is divided into individual chips by expanding the dicing tape in the known expanding process. The individual chips are then picked up in the known pick-up process. At this time, the dicing apparatus described in each of the above patent documents uses various three-dimensional shape measurement units to manage the shape of the machined groove, but there is a possibility that an undivided state in which the die attach film is not completely cut (divided) may occur due to the dicing. In this case, a large amount of undivided defects of the die attach film will occur in the pick-up process, and thus it is desirable to discover undivided defects in the die attach film in advance.

The present invention has been made in view of the above circumstances, and an object of the present invention is to provide a dicing apparatus and a method for controlling a dicing apparatus that can discover undivided defects in a die attach film.

In order to achieve an object of the present invention, there is provided a dicing apparatus that performs dicing of a street of a workpiece attached to a dicing tape via a die attach film and cuts the workpiece and the die attach film along the street, the apparatus including: a cross-sectional profile acquisition unit that acquires a cross-sectional profile of a machined groove formed through the dicing; a cut amount detection unit that detects a cut amount into the die attach film obtained through the dicing on the basis of the cross-sectional profile acquired by the cross-sectional profile acquisition unit; and a division determination unit that determines whether or not the die attach film is in an undivided state where the die attach film is not completely cut on the basis of the cut amount detected by the cut amount detection unit.

According to this dicing apparatus, it is possible to discover the undivided state of the die attach film.

In the dicing apparatus according to another aspect of the present invention, the cross-sectional profile acquisition unit includes a white interference microscope that divides white light into measurement light and reference light, irradiates the machined groove with the measurement light, images interference light between the measurement light reflected at the machined groove and the reference light reflected at a reference surface, and outputs interference signals, a scanning mechanism that scans a surface of the workpiece in a vertical direction with the white interference microscope, and a cross-sectional profile calculation unit that calculates the cross-sectional profile on the basis of the interference signals output from the white interference microscope during scanning with the white interference microscope by the scanning mechanism. As a result, it is possible to acquire the cross-sectional profile of the machined groove.

In the dicing apparatus according to another aspect of the present invention, the division determination unit determines whether or not the die attach film is in the undivided state on the basis of whether or not the cut amount detected by the cut amount detection unit is less than a predetermined threshold value. As a result, it is possible to discover the undivided state of the die attach film.

In the dicing apparatus according to another aspect of the present invention, the division determination unit determines whether or not the die attach film is in the undivided state on the basis of the cut amount detected by the cut amount detection unit and a signal intensity of the interference signal obtained from a bottom portion of the machined groove among the interference signals output from the white interference microscope. As a result, it is possible to improve the accuracy of determining whether or not the die attach film is in the undivided state.

In order to achieve an object of the present invention, there is provided a dicing apparatus that performs dicing of a street of a workpiece attached to a dicing tape via a die attach film and cuts the workpiece and the die attach film along the street, the apparatus including: a white interference microscope that divides white light into measurement light and reference light, irradiates the machined groove formed through the dicing with the measurement light, images interference light between the measurement light reflected at the machined groove and the reference light reflected at a reference surface, and outputs interference signals; a scanning mechanism that scans a surface of the workpiece in a vertical direction with the white interference microscope; and a division determination unit that determines whether or not the die attach film is in an undivided state where the die attach film is not completely cut on the basis of a signal intensity of the interference signal obtained from a bottom surface of the machined groove among the interference signals output from the white interference microscope during scanning with the white interference microscope by the scanning mechanism.

According to this dicing apparatus, it is possible to reduce the processing load for determining whether or not the die attach film is in the undivided state, and it is possible to execute the determination in a short time.

The dicing apparatus according to another aspect of the present invention further includes a notification unit that notifies of warning information in a case where the division determination unit determines that the die attach film is in the undivided state. As a result, it is possible to notify the operator of the occurrence of the undivided state of the die attach film, and thus the workpiece that has gone through the dicing is prevented from being transported to the subsequent processes, that is, the workpiece is prevented from becoming defective in the subsequent processes.

The dicing apparatus according to another aspect of the present invention further includes: a machining unit that executes the dicing; and a machining control unit that controls the machining unit to execute the dicing on the die attach film in the undivided state in a case where the division determination unit determines that the die attach film is in the undivided state. As a result, the undivided state of the die attach film is eliminated, and thus the workpiece is prevented from becoming defective in the subsequent processes.

In order to achieve an object of the present invention, there is provided a method for controlling a dicing apparatus that performs dicing of a street of a workpiece attached to a dicing tape via a die attach film and cuts the workpiece and the die attach film along the street, the method including: a cross-sectional profile acquisition step of acquiring a cross-sectional profile of a machined groove formed through the dicing; a cut amount detection step of detecting a cut amount into the die attach film obtained through the dicing on the basis of the cross-sectional profile acquired in the cross-sectional profile acquisition step; and a division determination step of determining whether or not the die attach film is in an undivided state where the die attach film is not completely cut on the basis of the cut amount detected in the cut amount detection step.

In order to achieve an object of the present invention, there is provided a method for controlling a dicing apparatus that performs dicing of a street of a workpiece attached to a dicing tape via a die attach film and cuts the workpiece and the die attach film along the street, the method including: a scanning step of scanning a surface of the workpiece in a vertical direction with a white interference microscope that divides white light into measurement light and reference light, irradiates the machined groove formed through the dicing with the measurement light, images interference light between the measurement light reflected at the machined groove and the reference light reflected at a reference surface, and outputs interference signals; and a division determination step of determining whether or not the die attach film is in an undivided state where the die attach film is not completely cut on the basis of a signal intensity of the interference signal obtained from a bottom surface of the machined groove among the interference signals output from the white interference microscope during scanning with the white interference microscope.

According to the present invention, undivided defects in the die attach film can be discovered.

BRIEF DESCRIPTION OF THE DRAWINGS

FIG. 7 is a table showing an example of the detection results of the cut amount detected by the cut amount detection unit.

FIG. 11 is an explanatory diagram for explaining generation of two-dimensional projection data by a projection data generation unit.

FIG. 12 is an explanatory diagram for explaining calculation of a cross-sectional profile 86 of a machined groove by a cross-sectional profile calculation unit of the second embodiment.

DETAILED DESCRIPTION OF THE INVENTION

First Embodiment

Figure 1:
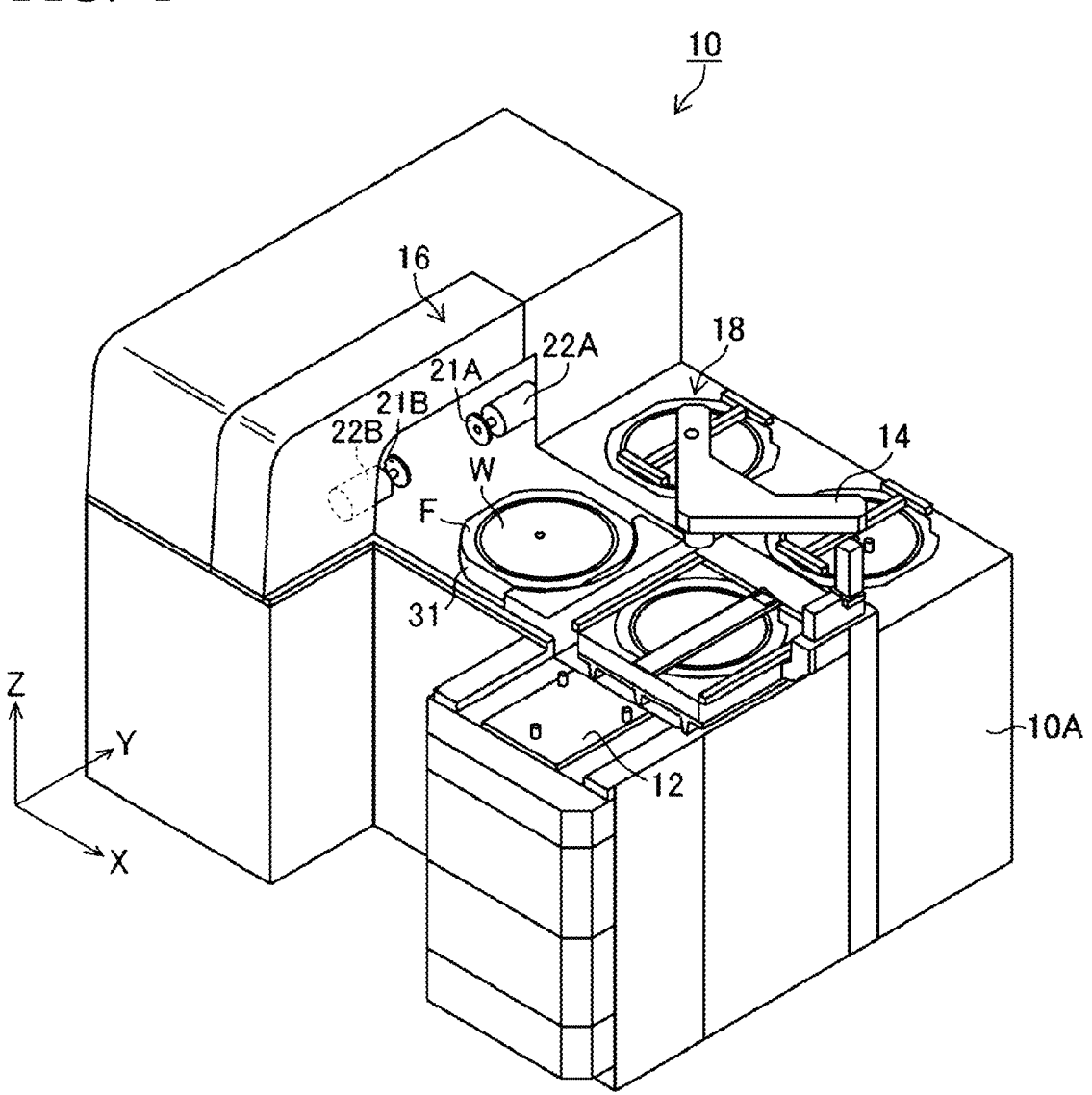
FIG. 1 is a perspective view of a dicing apparatus according to a first embodiment.
Figure 2:
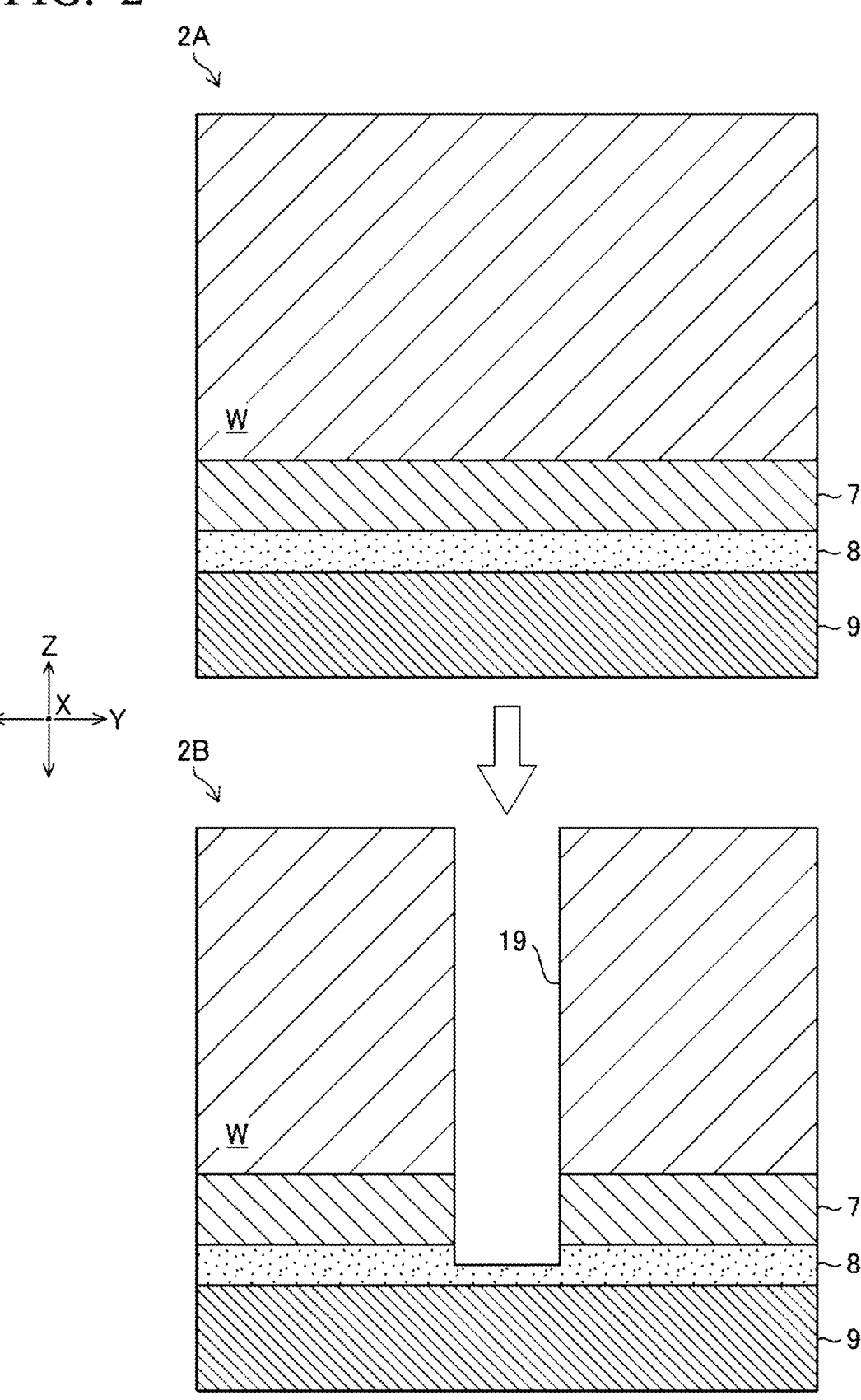
FIG. 2 is a cross-sectional view of a workpiece before the dicing and after the dicing.

FIG. 1 is a perspective view of a dicing apparatus 10 according to a first embodiment. FIG. 2 is a cross-sectional view of a workpiece W before the dicing (see reference sign 2A) and after the dicing (see reference sign 2B). XYZ directions in the figure are directions orthogonal to each other, XY directions are directions parallel to a horizontal direction, and a Z direction is a direction orthogonal to the horizontal direction (a vertical direction in the present invention).

As shown in FIG. 1, the dicing apparatus 10 dices the workpiece W in a flat shape such as a silicon wafer (a semiconductor wafer). This dicing apparatus 10 includes a load port 12, a transport mechanism 14, a machining unit 16, and a cleaning unit 18.

A cassette storing a large number of workpieces W mounted on a frame F is placed on the load port 12. The transport mechanism 14 transports the workpiece W. The machining unit 16 performs dicing on the workpiece W. The cleaning unit 18 spin-cleans the diced workpiece W. Further, inside a housing 10A of the dicing apparatus 10, a control device 60 that controls the operation of each part of the dicing apparatus 10 (see FIG. 5) and the like are provided. The control device 60 may be provided outside the housing 10A.

The unmachined workpiece W stored in the cassette placed on the load port 12 is transported to the machining unit 16 by the transport mechanism 14, and is subjected to dicing such as cutting or grooving by the machining unit 16 to be divided into individual chips. The workpiece W machined by the machining unit 16 is transported to the cleaning unit 18 by the transport mechanism 14, and after being cleaned by the cleaning unit 18, the workpiece W is transported to the load port 12 by the transport mechanism 14 and stored in the cassette.

As shown by reference signs 2A and 2B in FIG. 2, the dicing apparatus 10 performs dicing along streets (not shown) formed in a lattice pattern on the workpiece W, and thus forms a machined groove 19 along each street. In addition, a dicing tape 9 (also referred to as a base material) is attached to the back surface of the workpiece W on a side opposite to the front surface (a device forming surface) thereof via a DAF 7, which is a die attach film, and an adhesive layer 8. The materials and types of each of the DAF 7, the adhesive layer 8, and the dicing tape 9 are not particularly limited as long as they are used in known semiconductor manufacturing processes.

Figure 3:
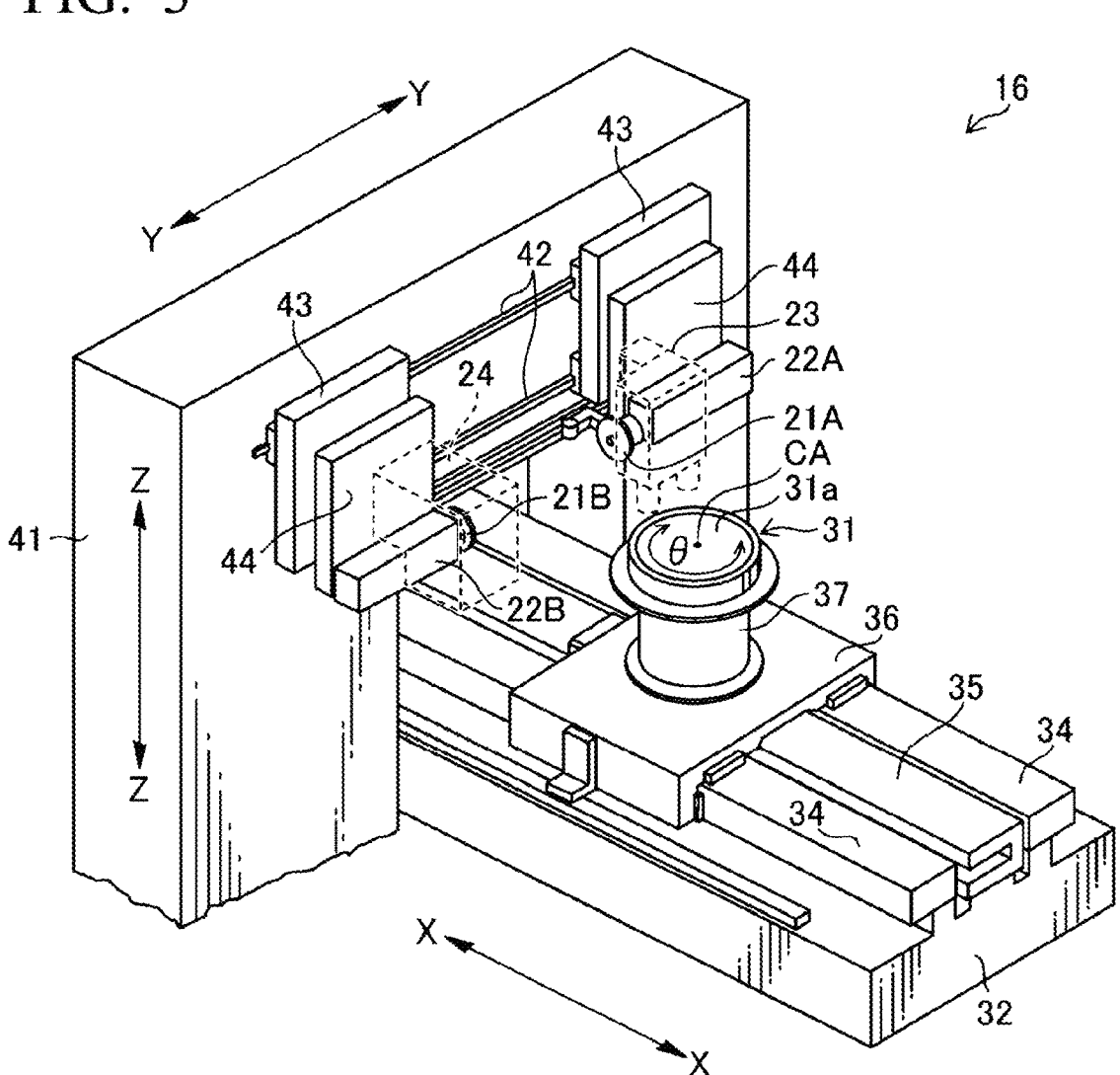
FIG. 3 is an external perspective view of a machining unit.

FIG. 3 is an external perspective view of the machining unit 16. As shown in FIG. 3 and FIG. 2 described above, the machining unit 16 is a twin-spindle dicer, and includes a pair of blades 21A and 21B, a blade cover (not shown), a pair of spindles 22A and 22B, a microscope 23, a white interference microscope 24, and a table 31.

The blades 21A and 21B are formed in a disk shape. Further, the tip end shape of each of the blades 21A and 21B, that is, the cross-sectional shape of a blade outer circumferential portion (a blade edge portion) along the radial direction of each of the blades 21A and 21B, is rectangular (other shapes such as V-shape are also possible). The blades 21A and 21B are disposed opposite to each other in the Y direction, and are held by the spindles 22A and 22B, respectively, to be rotatable about blade rotation axes parallel to the Y direction.

The spindles 22A and 22B have built-in high frequency motors and rotate the blades 21A and 21B at high speed about the blade rotation axes. As a result, each street of the workpiece W is diced (cut) by the blades 21A and 21B from the front surface (the device forming surface) of the workpiece W. As a result, the workpiece W and the DAF 7 are cut along each street, and thus the machined groove 19 is formed (see reference sign 2B in FIG. 2).

The microscope 23 is provided on a Z carriage 44 integrally with, for example, the spindle 22A (the spindle 22B is also possible), and is held movably in a YZ direction integrally with the spindle 22A by a Y carriage 43 and the Z carriage 44. The microscope 23 photographs a pattern on the surface of the workpiece W and the machined groove 19 from the surface side of the workpiece W. The photographed image of the surface of the workpiece W taken by the microscope 23 is used for alignment of the blades 21A and 21B with respect to the street of the workpiece W and for a kerf check to check the position of the machined groove 19.

The white interference microscope 24 is provided on the Z carriage 44 integrally with the spindle 22B (the spindle 22A is also possible), and is held movably in the YZ direction by a Y carriage 43 and the Z carriage 44. The white interference microscope 24 is used to acquire a three-dimensional coordinate data group (also referred to as point group data) representing a shape (a three-dimensional shape) of the machined groove 19. The three-dimensional coordinate data group is used to calculate the cross-sectional profile of the machined groove 19 and to check an undivided state of the DAF 7.

In the present embodiment, the microscope 23 and the white interference microscope 24 are provided separately from each other, but they may be integrated with each other.

The table 31 has a workpiece holding surface 31a formed in a porous shape, and this workpiece holding surface 31a adsorbs and holds the workpiece W from the back surface side of the workpiece W via the dicing tape 9 or the like. The table 31 is held movably in the X direction by an X carriage 36, which will be described below, and is held rotatably about a rotation axis CA by a rotation unit 37, which will be described below.

The machining unit 16 is provided with an X base 32, an X guide 34, an X drive unit 35, the X carriage 36, and the rotation unit 37. The X base 32 has a flat plate shape extending in the X direction, and is provided with the X guide 34 on its upper surface in the Z direction. The X guide 34 has a shape extending in the X direction, and guides the X carriage 36 in the X direction. As the X drive unit 35, for example, an actuator such as a linear motor is used, and the X drive part 35 moves the X carriage 36 in the X direction along the X guide 34.

The rotation unit 37 is provided on the upper surface of the X carriage 36. Furthermore, the table 31 is provided on the upper surface of the rotation unit 37. The rotation unit 37 is rotationally driven by a rotation drive unit (not shown) that is constituted by a motor, gears, and the like. As a result, the rotation unit 37 rotates the table 31 in a θ direction about the rotation axis CA thereof.

Further, the machining unit 16 is provided with a Y base 41, a Y guide 42, a pair of Y carriages 43, and a pair of Z carriages 44. The Y base 41 has a gate shape that straddles the X base 32 in the Y direction. The Y guide 42 is provided on the side surface of the Y base 41 on a side in the X direction. The Y guide 42 has a shape extending in the Y direction, and guides the pair of Y carriages 43 in the Y direction. The pair of Y carriages 43 are independently moved along the Y guide 42 by a Y drive unit 45 (see FIG. 5) that is constituted by, for example, a stepping motor, a ball screw, and the like.

Figure 5:
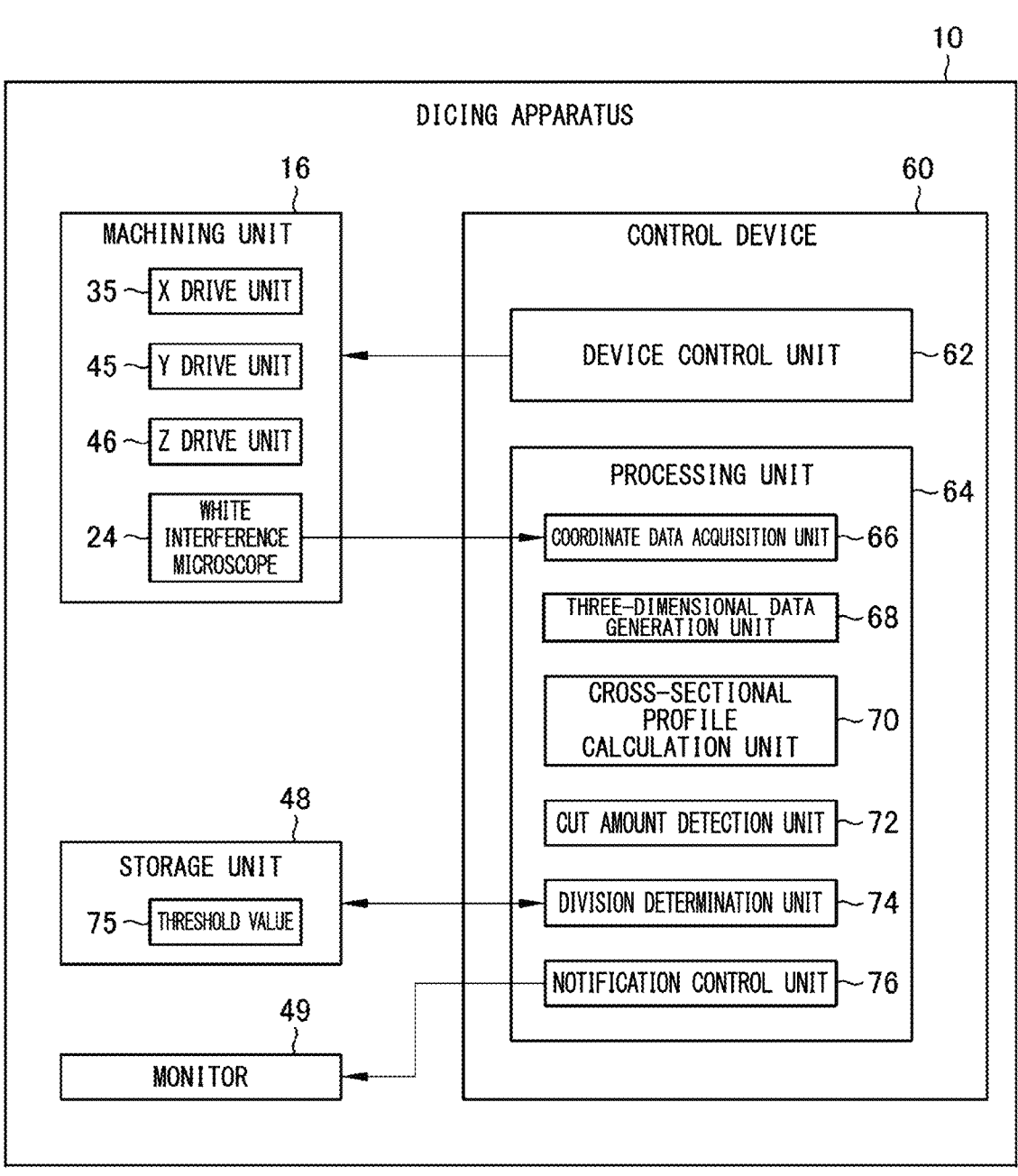
FIG. 5 is a block diagram of the dicing apparatus according to the first embodiment.

Each of the pair of Y carriages 43 is provided with the Z carriage 44 that is movable in the Z direction via a Z drive unit 46 (corresponding to a scanning mechanism of the present invention, see FIG. 5) constituted by an actuator such as a stepping motor. The spindle 22A and the microscope 23 are provided on one side of the Z carriage 44, and the spindle 22B and the white interference microscope 24 are provided on the other side of the Z carriage 44.

During dicing of the workpiece W, each part of the machining unit 16 is driven to execute cutting feed of the workpiece W in the X direction (a machining feed direction), index feed of the blades 21A and 21B in the Y direction, and infeed feed in the Z direction, and thus the machined groove 19 is formed along each street of the workpiece W.

Figure 4:
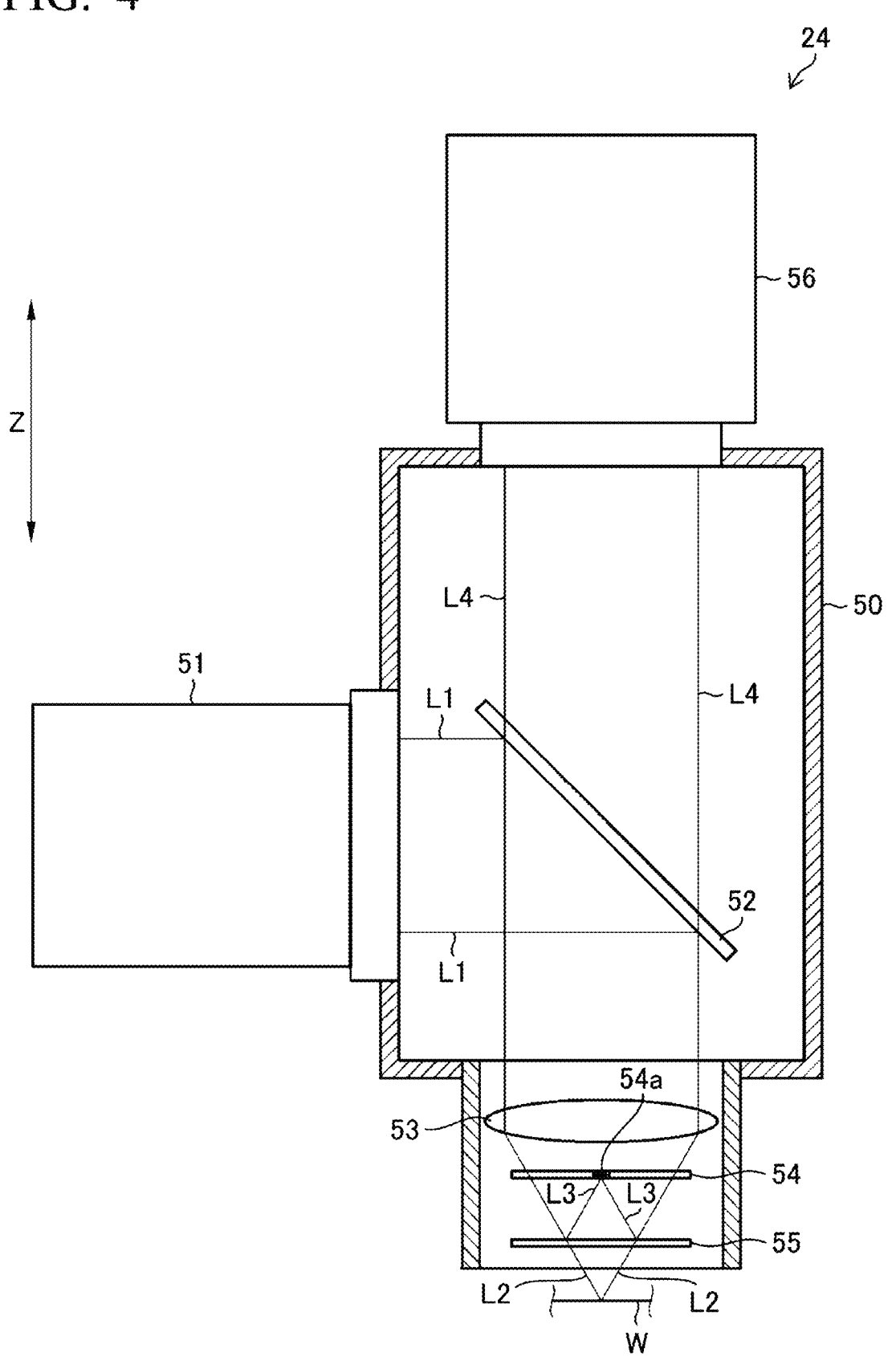
FIG. 4 is a cross-sectional view showing an example of a white interference microscope.

FIG. 4 is a cross-sectional view showing an example of the white interference microscope 24 that functions as a part of the cross-sectional profile acquisition unit of the present invention. As shown in FIG. 4, the white interference microscope 24 is a Mirau type white interferometer, and is used to measure the cross-sectional profile of the machined groove 19 by white interferometry and to check the undivided state of the DAF 7 on the basis of the measurement results. The white interference microscope 24 includes a housing 50, a white light source 51, a first beam splitter 52, an objective lens 53, a glass plate 54, a second beam splitter 55, and an imaging unit 56.

The housing 50 houses the first beam splitter 52, the objective lens 53, the glass plate 54, and the second beam splitter 55. Inside this housing 50, the second beam splitter 55, the glass plate 54, the objective lens 53, and the first beam splitter 52 are provided from the lower side toward the upper side in the Z direction. Further, the white light source 51 is attached to the side surface of the housing 50 at a position on the lateral side of the first beam splitter 52. Further, the imaging unit 56 is attached to the upper surface of the housing 50 at a position above the first beam splitter 52.

The white light source 51 outputs white light L1 toward the first beam splitter 52 while the white interference microscope 24 vertically scans the table 31 (the workpiece W) in the Z direction. The first beam splitter 52 reflects some of the white light L1 input from the white light source 51 toward the objective lens 53. Further, the first beam splitter 52 transmits some of interference light LA, which will be described below, that has input from the objective lens 53 and outputs the transmitted interference light LA toward the imaging unit 56.

The objective lens 53 focuses the white light L1 input from the first beam splitter 52 onto the workpiece W.

The glass plate 54 includes a mirror 54a that functions as a reference surface at the central portion thereof. The glass plate 54 (excluding the mirror 54a) transmits the white light L1 input from the objective lens 53 as it is and outputs the transmitted white light L1 toward the second beam splitter 55.

The second beam splitter 55 splits the white light L1 focused by the objective lens 53 into measurement light L2 and reference light L3, transmits the measurement light L2, irradiates the surface of the workpiece W with the measurement light L2, and reflects the reference light L3 toward the mirror 54a. The measurement light L2 transmitted through the second beam splitter 55 is reflected by the surface of the workpiece W and the surface of the machined groove 19 (a groove wall surface and a groove bottom surface) and is input to the second beam splitter 55. Further, the reference light L3 reflected by the mirror 54a is input to the second beam splitter 55, and some of the reference light L3 is reflected by the second beam splitter 55. As a result, the interference light L4 between the measurement light L2 and the reference light L3 is generated. This interference light LA is input to the imaging unit 56 via the glass plate 54, the objective lens 53, and the first beam splitter 52.

Here, the optical path length of the reference light L3 is constant, but the optical path length of the measurement light L2 changes according to the vertical scanning of the white interference microscope 24. As is well known, in a case where the focus point of the objective lens 53 is on various objects to be measured [here, the surfaces of the workpiece W and the machined groove 19], a difference in optical path length between the measurement light L2 and the reference light L3 is zero (including approximately zero), and the interference between the measurement light L2 and the reference light L3 becomes stronger. As a result, the signal intensity of the interference light LA increases.

The imaging unit 56 includes a two-dimensional imaging device of a charge coupled device (CCD) type or a complementary metal oxide semiconductor (CMOS) type in which a plurality of pixels (light receiving elements) are two-dimensionally arranged in the XY direction. The imaging unit 56 detects (acquires) the interference light L4 for each pixel by capturing the interference light LA input from the first beam splitter 52 for each pixel of the two-dimensional imaging device while the white interference microscope 24 performs vertical scanning in the Z direction one or more times by the Z drive unit 46 (see FIG. 5), and outputs the interference light LA for each pixel to the control device 60.

In the present embodiment, a Mirau-type interferometer has been described as an example of the white interference microscopes 24, but various interferometers (interference microscopes) used for shape measurement of various objects to be measured, such as Michelson-type interferometers, for example, may be used.

FIG. 5 is a block diagram of the dicing apparatus 10 according to the first embodiment. In FIG. 5, illustrations of components of the dicing apparatus 10 that are not related to checking of the undivided state of the DAF 7, which will be described below, are omitted as appropriate (see FIGS. 10, 13, and 15, which will be described below).

As shown in FIG. 5, the control device 60 of the dicing apparatus 10 generally controls each part of the dicing apparatus 10. In addition to the load port 12, the transport mechanism 14, the machining unit 16, and the cleaning unit 18 described above (illustrations are omitted in FIG. 5 except for the machining unit 16), a storage unit 48 and a monitor 49 are connected to the control device 60.

The storage unit 48 uses the various known storage media such as memory. In addition to an operation program (not shown) for operating the control device 60, a threshold value 75 used for determining the undivided state of the DAF 7, which will be described below, is stored in the storage unit 48.

As the monitor 49, the known display device such as a liquid crystal display is used, and the monitor 49 displays various operation screens and various setting screens of the dicing apparatus 10 as well as warning information 78 (see FIG. 8), which will be described below.

The control device 60 is, for example, a personal computer (PC), and includes an arithmetic circuit constituted by various processors, memories, and the like. The various processors include a central processing unit (CPU), a graphics processing unit (GPU), an application specific integrated circuit (ASIC), programmable logic devices [for example, a simple programmable logic device (SPLD), a complex programmable logic device (CPLD), and a field programmable gate array (FPGA)], and the like. The various functions of the control device 60 may be realized by one processor, or may be realized by a plurality of processors of the same type or different types.

The control device 60 functions as a device control unit 62 and a processing unit 64 by executing a control program (not shown). The control device 60, together with the white interference microscope 24 and the Z drive unit 46 described above, functions as a cross-sectional profile acquisition unit of the present invention.

During the dicing of the workpiece W, the device control unit 62 controls each part of the machining unit 16 (each of the driving units 35, 45, and 46, the microscope 23, each of the spindles 22A and 22B, and the like) to execute the known alignment, and then to execute forming the machined groove 19 (cutting the workpiece W and the DAF 7) by cutting along each street. A specific method of dicing is the known technique, and thus a specific explanation will be omitted here (for example, see Japanese Unexamined Patent Application, First Publication No. 2020-37171).

Further, after one or more streets or all streets of the workpiece W are diced, the device control unit 62 controls each part of the machining unit 16 (each of the driving units 35, 45, and 46, the white interference microscope 24, and the like) to execute shape measurement of the machined groove 19 using the know white interferometry.

For example, the device control unit 62 controls each of the drive units 35, 45, and 46 to execute adjusting the position of the white interference microscope 24 with respect to the workpiece W such that the white interference microscope 24 is positioned above the machined groove 19 in the Z direction. Next, the device control unit 62 controls the Z drive unit 46 to cause the white interference microscope 24 to vertically scan in the Z direction, while continuously executing the emitting of the white light L1 from the white light source 51 and the capturing of the interference light LA and the outputting of an interference signal by the imaging unit 56. While the vertical scanning of the white interference microscope 24 is being executed, the interference signals are continuously output from the two-dimensional imaging device of the imaging unit 56 for each pixel thereof to the control device 60. Then, the device control unit 62 repeatedly executes the position change of the white interference microscope 24 in the XY direction relative to the workpiece W, the vertical scanning of the white interference microscope 24, and the capturing of the interference light L4 and the outputting of the interference signal by the imaging unit 56, such that the shape measurement of the machined groove 19 is performed for any street of the workpiece W.

Furthermore, in a case where the DAF 7 is determined to be in the undivided state by a division determination unit 74 which will be described below, the device control unit 62 controls each part of the machining unit 16 (each of the drive unit 35, 45, and 46, the microscope 23, each of the spindles 22A and 22B, and the like) to execute dicing (re-machining) of the DAF 7 in the undivided state. In this case, the device control unit 62 functions as a machining control unit of the present invention.

The processing unit 64 executes calculation of the cross-sectional profile of the machined groove 19 on the basis of the interference signals output from the two-dimensional imaging device of the imaging unit 56 for each pixel during vertical scanning of the white interference microscope 24, and further determines whether or not the DAF 7 is in the undivided state on the basis of this cross-sectional profile. This processing unit 64 functions as a coordinate data acquisition unit 66, a three-dimensional data generation unit 68, a cross-sectional profile calculation unit 70, a cut amount detection unit 72, a division determination unit 74, and a notification control unit 76.

The coordinate data acquisition unit 66 acquires the three-dimensional coordinate data group consisting of a plurality of pieces of three-dimensional coordinate data (XYZ coordinate data) representing a three-dimensional shape of the machined groove 19 in the known method on the basis of the interference signals output from the two-dimensional imaging device of the imaging unit 56 for each pixel (XY coordinates) during vertical scanning of the white interference microscope 24 (see Patent Document 1 above).

The three-dimensional data generation unit 68 generates three-dimensional data (a three-dimensional model) of the machined groove 19 using the known method on the basis of the three-dimensional coordinate data group of the machined groove 19 acquired by the coordinate data acquisition unit 66 (see Patent Document 1).

The cross-sectional profile calculation unit 70 calculates the cross-sectional profile of the machined groove 19 (see FIG. 12) by cutting out an arbitrary cross section or a cross section specified by the user from the three-dimensional data of the machined groove 19 generated by the three-dimensional data generation unit 68.

Figure 6:
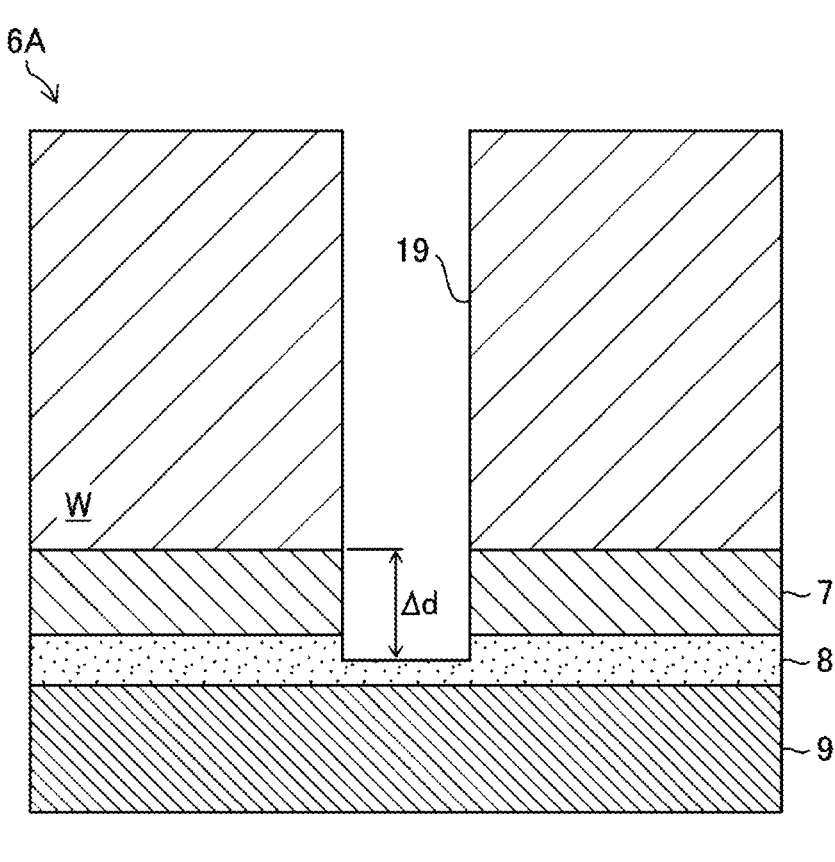
FIG. 6 is an explanatory diagram for explaining detection of the cut amount of a die attach film (DAF) by a cut amount detection unit and determination of presence or absence of an undivided state by a division determination unit.
Figure 6:
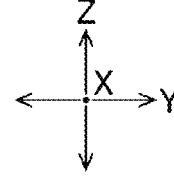
Figure 6:
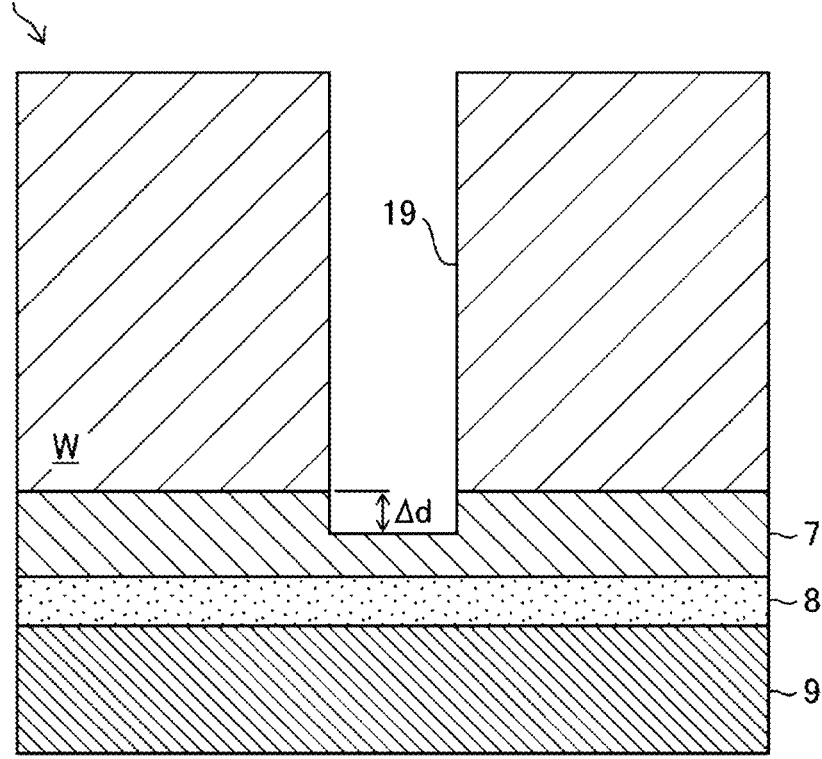

FIG. 6 is an explanatory diagram for explaining the detection of the cut amount $\Delta d$ of the DAF 7 by the cut amount detection unit 72 and the determination of presence of absence of the undivided state of the DAF 7 by the division determination unit 74. The reference sign 6A in FIG. 6 indicates a state in which the DAF 7 is completely cut (divided) through the dicing, and the reference sign 6B indicates a state in which the DAF 7 is not divided through the dicing.

As shown in the reference sign 6A and the reference sign 6B in FIG. 6 and FIG. described above, the cut amount detection unit 72 detects the cut amount $\Delta d$ into the DAF 7 in the Z direction through the dicing on the basis of the cross-sectional profile of the machined groove 19 calculated by the cross-sectional profile calculation unit 70. This cut amount $\Delta d$ is a cut depth of the DAF 7 (including the adhesive layer 8) in the Z direction from the surface of the DAF 7 (the surface on a side of the workpiece W).

For example, in a case where it is possible to discriminate a boundary surface between the workpiece W and the DAF 7 from the cross-sectional profile of the machined groove 19, the cut amount detection unit 72 detects the depth of the machined groove 19 below this boundary surface in the Z direction as the cut amount $\Delta d$. Conversely, in a case where it is not possible to discriminate a boundary surface between the workpiece W and the DAF 7 from the cross-sectional profile of the machined groove 19, the cut amount detection unit 72 first detects the depth of the machined groove 19 (the length in the Z direction from the surface of the workpiece W to the bottom surface of the machined groove 19) from the cross-sectional profile. Next, the cut amount detection unit 72 detects a value obtained by subtracting the known thickness of the workpiece W from the depth of the machined groove 19 as the cut amount $\Delta d$.

FIG. 7 is a table showing an example of the detection results of the cut amount $\Delta d$ detected by the cut amount detection unit 72. As shown in FIG. 7, the dicing process was executed by the dicing apparatus 10 to a plurality of workpieces W with different film thicknesses (10 µm, 20 µm, and 40 µm) of the DAF 7 such that the DAF 7 was in a divided state in which the DAF 7 is completely cut and an undivided state in which the DAF 7 is not completely cut.

Specifically, the dicing was executed on the workpiece W in which the DAF 7 had a film thickness of 10 µm such that the target value of the cut amount $\Delta d$ was 25 µm (a divided state) and 5 µm (an undivided state). Further, the dicing was executed on the workpiece W in which the DAF 7 had a film thickness of 20 µm such that the target value of the cut amount $\Delta d$ was 35 µm (a divided state) and 15 µm (an undivided state). Furthermore, the dicing was executed on the workpiece W in which the DAF 7 had a film thickness of 40 µm such that the target value of the cut amount $\Delta d$ was 60 µm (a divided state) and 35 µm (an undivided state).

Then, as described above, the cross-sectional profiles of the machined grooves 19 formed through the dicing were measured, the detection of the cut amounts Δd was executed by the cut amount detection unit 72, and the average value (Avg), maximum value (Max), minimum value (Min), and 3 of the cut amounts Δd were calculated. As a result, a difference in cut amount Δd was checked between the divided state and the undivided state of DAF 7. For this reason, it was checked that by appropriately setting the threshold value 75 of the cut amount Δd (see FIG. 5), it is possible to determine whether the DAF 7 is in the divided state or the undivided state on the basis of the results of comparing the cut amount Δd detected by the cut amount detection unit 72 with the threshold value 75. This threshold value 75 is obtained for each type of the workpiece W and the DAF 7 by executing an experiment or simulation in advance, and is stored in the storage unit 48.

Returning to FIGS. 5 and 6, the division determination unit 74 determines whether or not the DAF 7 is in the undivided state on the basis of whether or not the cut amount Δd detected by the cut amount detection unit 72 is less than the threshold value 75 in the storage unit 48. In a case where the division determination unit 74 determines that the DAF 7 is in the undivided state, the division determination unit 74 outputs the determination results to the notification control unit 76. Further, in a case where the division determination unit 74 determines that the DAF 7 is in the undivided state, division determination unit 74 outputs street position information indicating the position of the street where the undivided state has occurred to the device control unit 62. As a result, on the basis of the street position information input from the division determination unit 74, the device control unit 62 controls each part of the machining unit 16 (each of the drive unit 35, 45, and 46, the microscope 23, each of the spindles 22A and 22B, and the like) to execute dicing (re-machining) of the DAF 7 in the undivided state.

Figure 8:
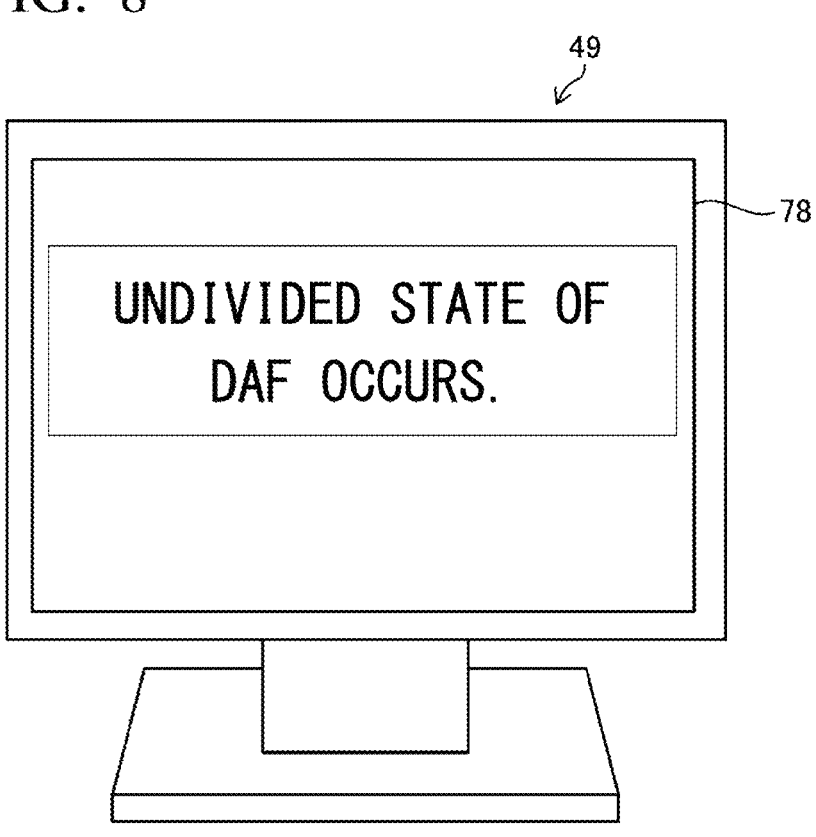
FIG. 8 is an explanatory diagram for explaining notification of warning information by a notification control unit.

FIG. 8 is an explanatory diagram for explaining display (notification) of the warning information 78 by the notification control unit 76. As shown in FIG. 8 and FIG. 5 described above, the notification control unit 76, together with the monitor 49, functions as a notification unit of the present invention. In a case where the determination results indicating that the DAF 7 is in the undivided state are input from the division determination unit 74, the notification control unit 76 displays the warning information 78 to that effect on the monitor 49, and thus notifies the operator of the warning information 78. Instead of or in addition to displaying the warning information 78 on the monitor 49, the warning information 78 may be output as a sound from a speaker (not shown).

[Operation of First Embodiment]

Figure 9:
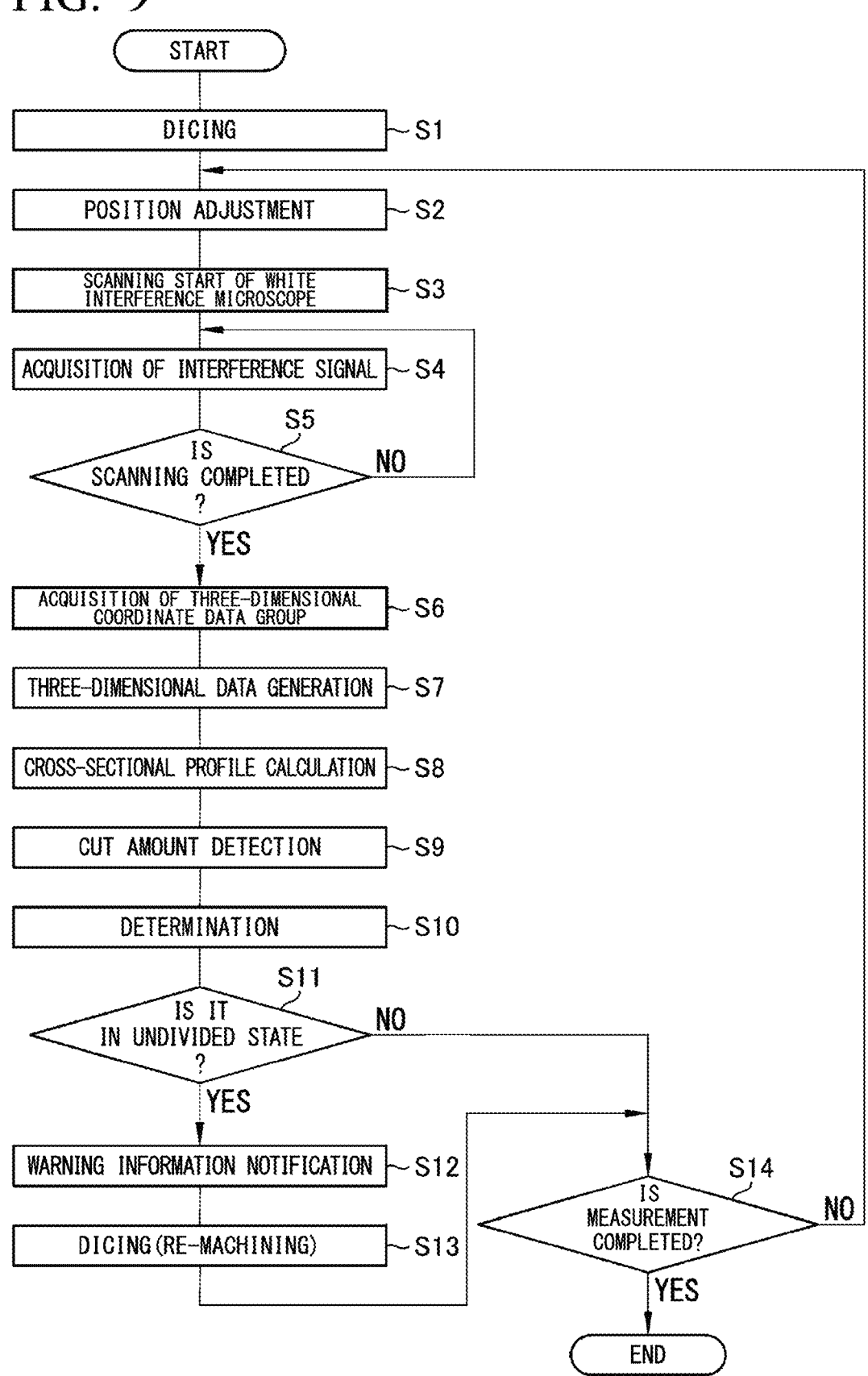
FIG. 9 is a flowchart showing the flow of the dicing of the workpiece by the dicing apparatus of the first embodiment, and particularly the checking processing of the undivided state of the DAF.

FIG. 9 is a flowchart showing the flow of the dicing of the workpiece W by the dicing apparatus 10 of the first embodiment, and particularly the checking processing of the undivided state of the DAF 7, according to a method for controlling the dicing apparatus 10 of the present invention.

As shown in FIG. 9, when the workpiece W is set on the workpiece holding surface 31a of the table 31, the device control unit 62 controls each part of the machining unit 16 to repeatedly execute the alignment of the blades 21A and 21B to the machining start position of the street of the workpiece W and the formation of the machined groove 19 through the dicing along the street for each arbitrary street (step S1).

Next, the device control unit 62 controls the X drive unit 35 and the Y drive unit 45 to adjust the position of the white interference microscope 24, and thus the optical axis of the white interference microscope 24 is aligned with one end of the machined groove 19 formed along the street (step S2).

Then, the device control unit 62 controls the Z drive unit 46 to start the vertical scanning of the white interference microscope 24 (step S3). Further, at the same time, the device control unit 62 executes the capturing of the interference light L4 and the outputting of an interference signal IS by the imaging unit 56. As a result, the coordinate data acquisition unit 66 of the control device 60 continuously acquires the interference signals from the imaging unit 56 for each pixel thereof during the vertical scanning of the white interference microscope 24 (step S5 and NO in step S4).

When the vertical scanning of the white interference microscope 24 is completed (YES in step S5), the coordinate data acquisition unit 66 acquires the three-dimensional coordinate data group of the machined groove 19 on the basis of the interference signals output from the imaging unit 56 for each pixel during the vertical scanning of the white interference microscope 24 (step S6). Next, the three-dimensional data generation unit 68 generates the three-dimensional data of the machined groove 19 on the basis of the three-dimensional coordinate data group of the machined groove 19 (step S7), and the cross-sectional profile calculation unit 70 calculates the cross-sectional profile of the machined groove 19 on the basis of the three-dimensional data of the machined groove 19 (step S8). Step S2 to step S8 correspond to a cross-sectional profile acquisition step of the present invention.

When the calculation of the cross-sectional profile of the machined groove 19 is completed, the cut amount detection unit 72 detects the cut amount Δd into the DAF 7 through the dicing on the basis of the cross-sectional profile of the machined groove 19, as shown in FIG. 6 described above (step S9, which corresponds to the cut amount detection step of the present invention).

Next, the division determination unit 74 compares the cut amount Δd detected by the cut amount detection unit 72 with the threshold value 75 in the storage unit 48, and determines whether or not the DAF 7 is in the undivided state on the basis of whether or not the cut amount Δd is less than the threshold value 75 (step S10, which corresponds to a division determination step of the present invention). In a case where the division determination unit 74 determines that the DAF 7 is not in the undivided state (is in the divided state), the process proceeds to step S14, which will be described below (NO in step S11).

On the other hand, in a case where the division determination unit 74 determines that the DAF 7 is in the undivided state (YES in step S11), the determination results are output from the division determination unit 74 to the notification control unit 76, and the street position information of the street at which the undivided state of the DAF 7 has occurred is output from the division determination unit 74 to the device control unit 62.

Then, on the basis of the determination results input from the division determination unit 74, the notification control unit 76 displays the warning information 78 on the monitor 49, and thus notifies the operator of the warning information 78 (step S12). As a result, it is possible to notify the operator of the occurrence of the undivided state of the DAF 7, and thus the workpiece W is prevented from being transported to the subsequent processes, that is, the workpiece W is prevented from becoming defective in the subsequent processes.

Furthermore, on the basis of the street position information input from the division determination unit 74, the device control unit 62 controls each part of the machining unit 16 to execute dicing (re-machining) of the DAF 7 in the undivided state (step S13). As a result, the undivided state of the DAF 7 is eliminated, and thus the workpiece W is prevented from becoming defective.

Next, the device control unit 62 controls the X drive unit 35 and the Y drive unit 45 to execute adjusting the position of the white interference microscope 24 for the next measurement region of the machined groove 19 (NO in step S14, step S2). Then, the processing from step S3 to step S13 described above is repeatedly executed. Similarly, the determination of presence or absence of the undivided state of the DAF 7 with respect to the machined groove 19 of an arbitrary street, the notification of the warning information 78 in a case where the undivided state of the DAF 7 has occurred, and the re-machining are repeatedly executed, and the entire dicing process of the workpiece W is completed (YES in step S14).

As described above, in the dicing apparatus 10 of the first embodiment, it is possible to discover the undivided defects in the DAF 7 during the dicing process of the workpiece W by executing the acquisition of the cross-sectional profile of the machined groove 19, the detection of the cut amount Δd into the DAF 7, and the determination of presence or absence of the undivided state of the DAF 7 after each street of the workpiece W is diced. As a result, the discovery of the undivided defects in the DAF 7 in the subsequent processes (an expanding process and a pick-up process) is prevented, and thus the workpiece W is prevented from becoming defective in the subsequent processes.

Second Embodiment

Figure 10:
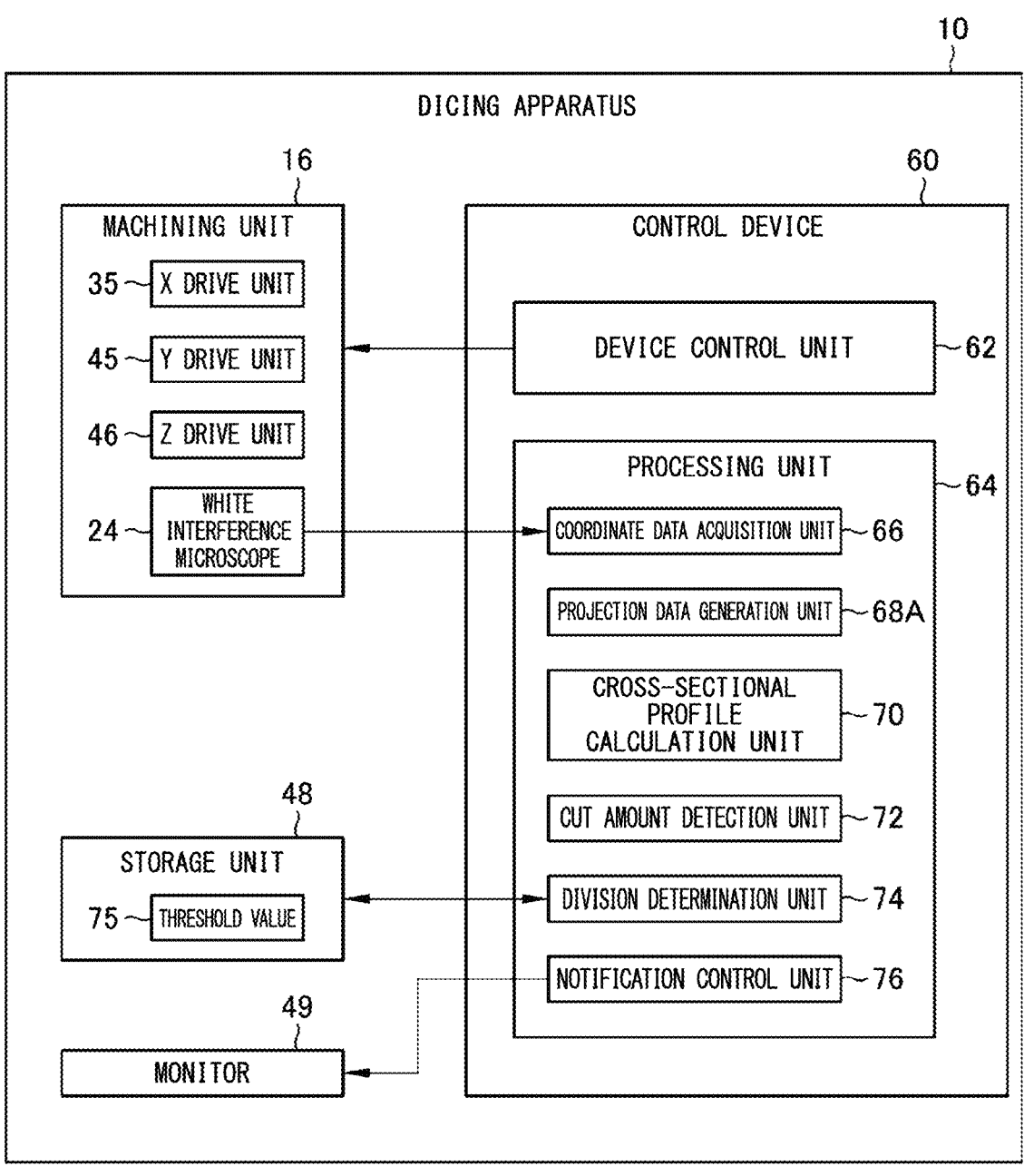
FIG. 10 is a block diagram of a dicing apparatus according to a second embodiment.

FIG. 10 is a block diagram of a dicing apparatus 10 according to a second embodiment. In the dicing apparatus 10 of the first embodiment, the cross-sectional profile calculation unit 70 calculates the cross-sectional profile of the machined groove 19 on the basis of the three-dimensional data of the machined groove 19, but in the dicing apparatus 10 of the second embodiment, the cross-sectional profile of the machined groove 19 is calculated using a method different from that of the first embodiment.

The dicing apparatus 10 of the second embodiment has basically the same configuration as the dicing apparatus 10 of the first embodiment described above, except that the processing unit 64 of the control device 60 functions as a projection data generation unit 68A instead of the three-dimensional data generation unit 68 of the first embodiment. For this reason, the same elements in function or configuration as those in the first embodiment described above are designated by the same reference signs, and the description thereof will be omitted.

Figure 11:
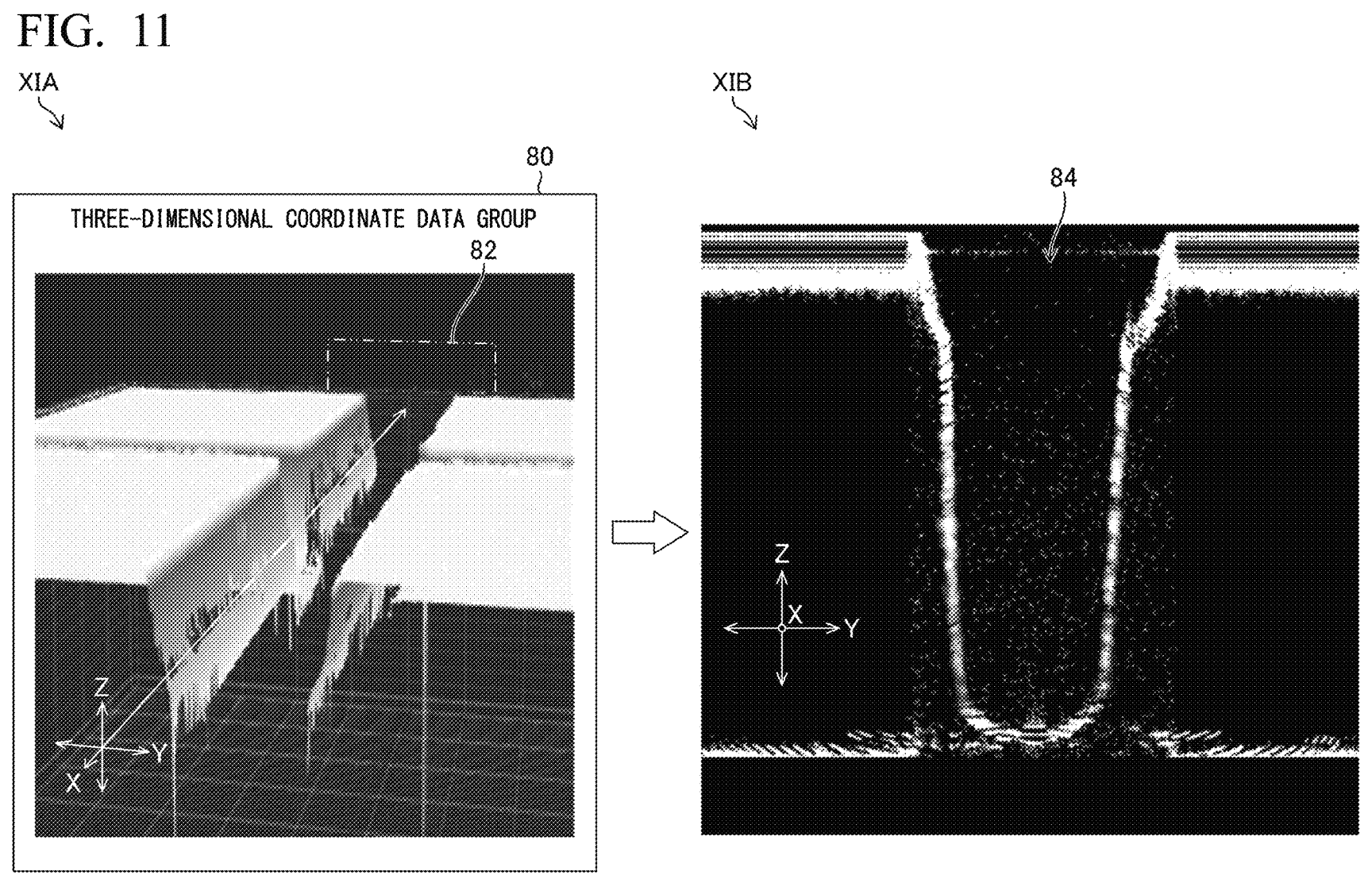

FIG. 11 is an explanatory diagram for explaining generation of two-dimensional projection data 84 by the projection data generation unit 68A. In FIG. 11, in order to explain the projection of a three-dimensional coordinate data group 80 of the machined groove 19 onto a two-dimensional plane by the projection data generation unit 68A with an image, the three-dimensional coordinate data group 80 indicated by a reference sign XIA is represented with the three-dimensional data (the image), but in the second embodiment, the three-dimensional data of the machined groove 19 is not generated.

As shown in FIG. 11, the projection data generation unit 68A projects each dot of the three-dimensional coordinate data group 80 (a point group) of the machined groove 19 acquired by the coordinate data acquisition unit 66 onto a two-dimensional plane 82 which is a virtual YZ plane that is vertical to the X direction that is a machining feed direction (see reference sign XIA). As a result, the projection data generation unit 68A generates the two-dimensional projection data 84 of the machined groove 19 (see reference sign XIB).

In the two-dimensional projection data 84, data variation occurs due to variation in the shape of the machined groove 19 in the X direction, vibration caused when the shape measurement of the machined groove 19 is performed by the white interference microscope 24, and the like. For this reason, the two-dimensional projection data 84 reflects the variation in the shape of the machined groove 19 in the X direction. Such two-dimensional projection data 84 can be generated by simply projecting each dot of the three-dimensional coordinate data group 80 onto the two-dimensional plane 82, and thus the load of the generation processing thereof is less than that of the three-dimensional data (the three-dimensional model) as in the first embodiment.

Figure 12:
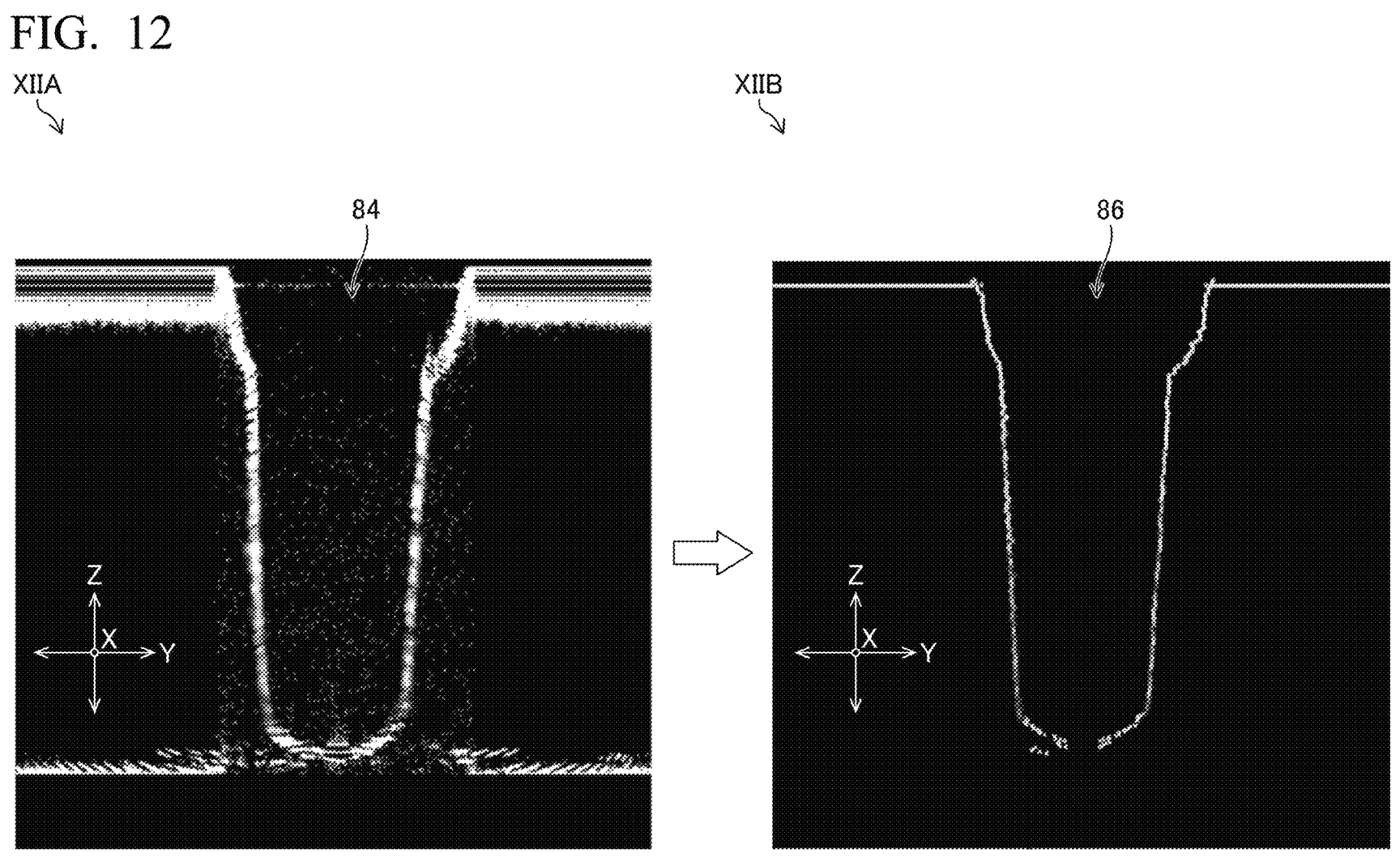

FIG. 12 is an explanatory diagram for explaining calculation of a cross-sectional profile 86 of the machined groove 19 by the cross-sectional profile calculation unit 70 of the second embodiment. As shown by reference sign XIIA in FIG. 12, the cross-sectional profile calculation unit 70 of the second embodiment calculates the cross-sectional profile 86 of the machined groove 19 as shown by reference sign XIIB on the basis of the two-dimensional projection data 84 generated by the projection data generation unit 68A. Specifically, the cross-sectional profile calculation unit 70 calculates the cross-sectional profile 86 by performing noise removal processing, statistical processing, and the like on the two-dimensional projection data 84.

Here, if vibration occurs when the shape measurement of the machined groove 19 is performed by the white interference microscope 24, variation will occur in the shape measurement results (dot data of the three-dimensional coordinate data group 80). For example, the dicing apparatus 10 may use an air guide and a linear motor for the X guide 34 and the X drive unit 35 for the purpose of high accuracy and high durability, but in this case, a regulation force in the X direction becomes weak. For this reason, in a case where an X axis slightly oscillates during the shape measurement of the machined groove 19 due to external disturbance vibration in the floor environment where the dicing apparatus 10 is installed and vibration caused by other units (the unit for spin cleaning, and the like) mounted on the dicing apparatus 10, error (variation) will occur in the shape measurement results of the machined groove 19.

To solve this problem, it is necessary to design a highly rigid stage, but if vibration suppression is performed at an accuracy level that is acceptable to the dicing apparatus 10 by calculating the cross-sectional profile 86 as in the second embodiment, it is possible to perform statistical analysis due to the effect of integrating and projecting the shape measurement data in the X direction, and it is possible to realize improvement of robustness. Furthermore, it is possible to measure the cross-sectional profile 86 with higher accuracy than in the case of measuring the three-dimensional data in the related art.

Hereinafter, similarly to the first embodiment, on the basis of the cross-sectional profile 86 calculated by the cross-sectional profile calculation unit 70, the detection of the cut amount Δd of the DAF 7 by the cut amount detection unit 72 and the determination of presence of absence of the undivided state of the DAF 7 by the division determination unit 74 are executed.

As described above, in the dicing apparatus 10 of the second embodiment, the two-dimensional projection data 84 is generated from the three-dimensional coordinate data group 80 of the machined groove 19, and the cross-sectional profile 86 is calculated from this two-dimensional projection data 84, and thus it is no longer necessary to generate the three-dimensional data and cut out a cross section from this three-dimensional data as in the related art. As a result, the processing load on the control device 60 is reduced, and thus the calculation speed of the cross-sectional profile 86 is improved. Moreover, even in a case where vibration occurs during the shape measurement of the machined groove 19, the cross-sectional profile 86 can be measured with high accuracy. Furthermore, the same effects as those in the dicing apparatus 10 of the first embodiment described above can be obtained.

Third Embodiment

Figure 13:
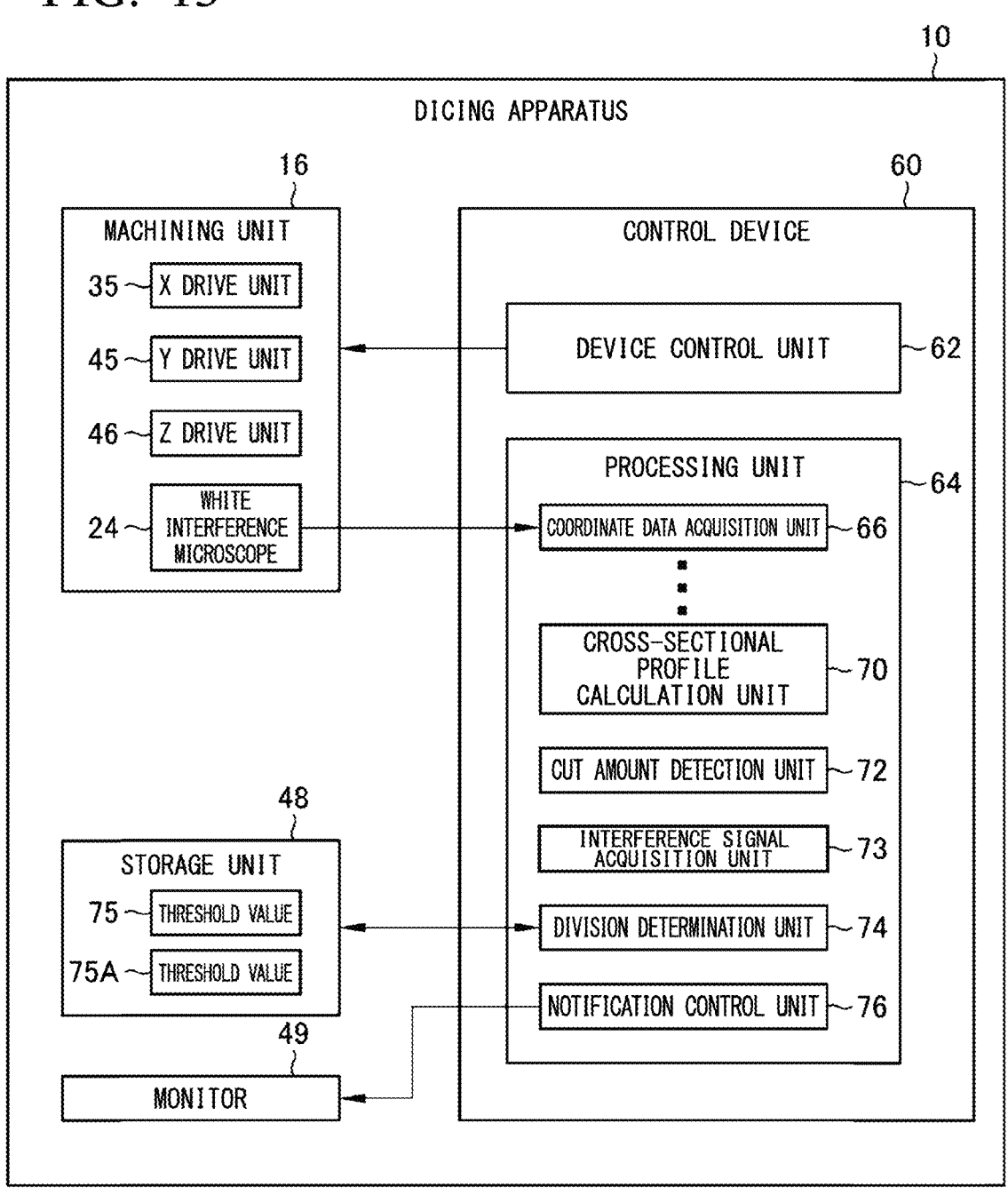
FIG. 13 is a block diagram of a dicing apparatus according to a third embodiment.

FIG. 13 is a block diagram of a dicing apparatus 10 according to a third embodiment. In the dicing apparatus 10 of each of the embodiments described above, the division determination unit 74 determines whether or not the DAF 7 is in the undivided state on the basis of the results of the detection of the cut amount Δd by the cut amount detection unit 72. On the other hand, in the dicing apparatus 10 of the third embodiment, it is determined whether or not the DAF 7 is in the undivided state on the basis of the cut amount Δd detected by the cut amount detection unit 72 and the interference signal acquired by the coordinate data acquisition unit 66 from the white interference microscope 24.

The dicing apparatus 10 of the third embodiment has basically the same configuration as the dicing apparatus 10 of each of the embodiments described above, except that the processing unit 64 of the control device 60 functions as an interference signal acquisition unit 73 and the storage unit 48 further stores a threshold value 75A. For this reason, the same elements in function or configuration as those in each of the embodiments described above are designated by the same reference signs, and the description thereof will be omitted.

Similar to the coordinate data acquisition unit 66, the interference signal acquisition unit 73 continuously acquires the interference signals IS (see FIG. 14) output from the imaging unit 56 for each pixel thereof during the vertical scanning of the white interference microscope 24.

Figure 14:
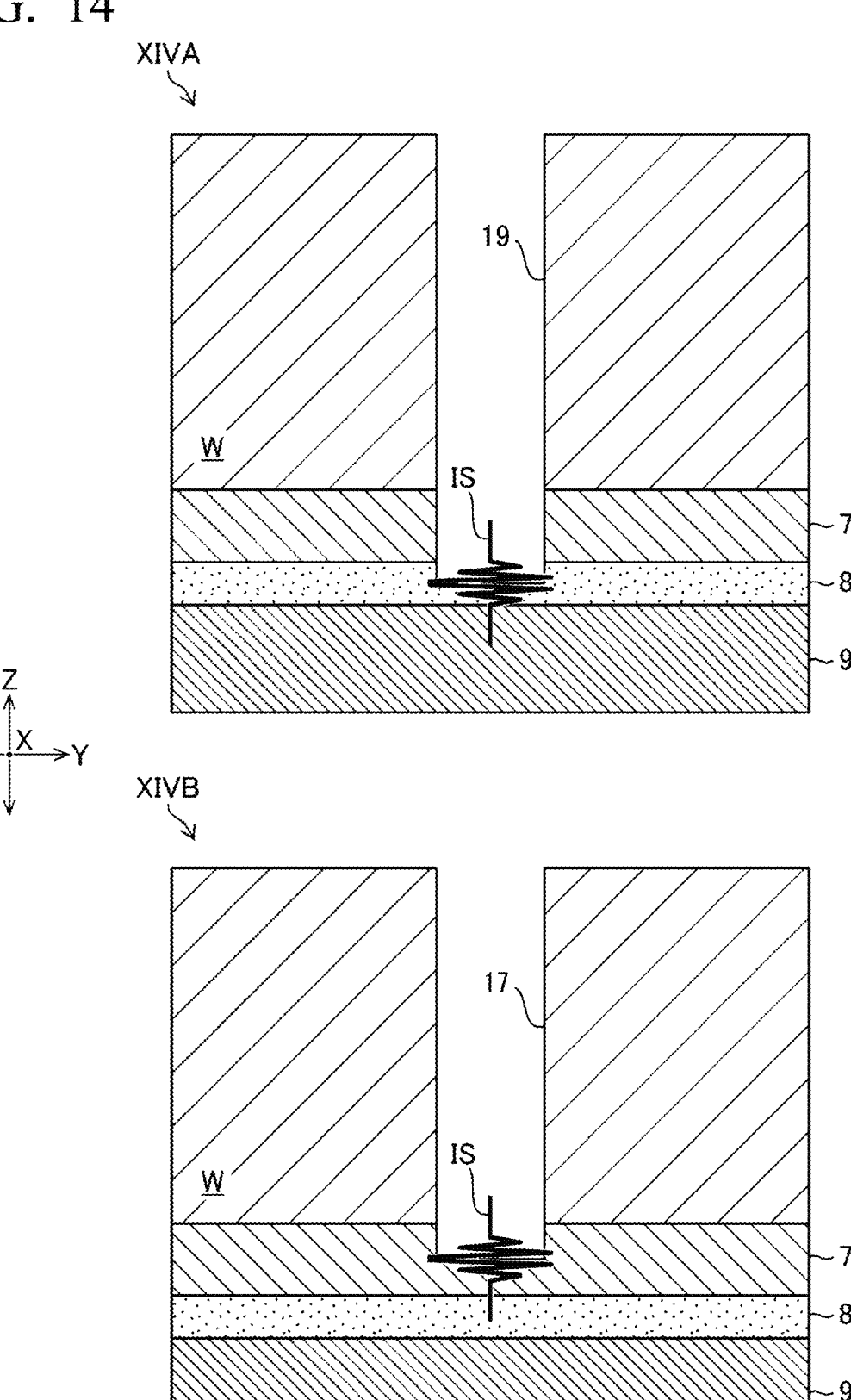
FIG. 14 is an explanatory diagram for explaining the relationship between a signal intensity of an interference signal and a material of a bottom portion of a machined groove.

FIG. 14 is an explanatory diagram for explaining the relationship between a signal intensity of the interference signal IS and a material of a bottom portion (a bottom surface) of the machined groove 19. As shown by reference sign XIVA in FIG. 14, in a case where the DAF 7 is in the divided state, the material (the composition) of the bottom portion of the machined groove 19 becomes the adhesive layer 8. On the other hand, as shown by reference sign XIVB in FIG. 14, in a case where the DAF 7 is in the divided state, the material (the composition) of the bottom portion of the machined groove 17 becomes the DAF 7. Therefore, the material of the bottom portion of the machined groove 19 changes depending on whether the DAF 7 is in the divided state or the undivided state.

At this time, the signal intensity of the interference signal IS that is acquired by the white interference microscope 24 from the bottom portion of the machined groove 19 changes depending on the material of the bottom portion of the machined groove 19. For this reason, in a case where the signal intensity of the interference signal IS acquired by the white interference microscope 24 is close to the signal intensity of the interference signal IS obtained with the DAF 7 as a measurement target, it is possible to determine that the DAF 7 is in the undivided state. Therefore, by appropriately setting the threshold value 75A of the signal intensity of the interference signal IS (see FIG. 13), it is possible to determine whether the DAF 7 is in the divided state or the undivided state on the basis of the results of comparing the interference signal IS acquired by the interference signal acquisition unit 73 with the threshold value 75A. This threshold value 75A is obtained for each type of the DAF 7 and the adhesive layer 8 by executing an experiment or simulation in advance, and is stored in the storage unit 48. As a result, it is possible to determine whether or not the DAF 7 is in the undivided state on the basis of whether or not the signal intensity of the interference signal IS satisfies the threshold value 75A.

Returning to FIG. 13, the division determination unit 74 of the third embodiment determines whether or not the DAF 7 is in the undivided state on the basis of the cut amount Δd detected by the cut amount detection unit 72 and the interference signal IS acquired by the interference signal acquisition unit 73. Specifically, similarly to each of the embodiments described above, the division determination unit 74 determines whether or not the cut amount Δd detected by the cut amount detection unit 72 is less than the threshold value 75 in the storage unit 48.

Furthermore, the division determination unit 74 discriminates the signal intensity of the interference signal IS obtained from the bottom portion of the machined groove 19 from among the interference signals IS for each pixel of the imaging unit 56 acquired by the interference signal acquisition unit 73. For example, the division determination unit 74 discriminates the signal intensity of the interference signal IS obtained from the bottom portion of the machined groove 19 on the basis of the pixel address (the XY coordinates) of the imaging unit 56, the signal intensity distribution of the interference signals IS, and the like. Next, the division determination unit 74 determines whether or not the signal intensity of the interference signal IS obtained from the bottom portion of the machined groove 19 satisfies the threshold value 75A in the storage unit 48.

Then, the division determination unit 74 determines that the DAF 7 is in the undivided state in the case where the cut amount Δd is less than the threshold value 75, the case where the signal intensity of the interference signal IS satisfies the threshold value 75A, or both cases. Conversely, the division determination unit 74 determines that the DAF 7 is in the divided state in the case where the cut amount Δd is equal to or greater than the threshold value 75 and the signal intensity of the interference signal IS does not satisfy the threshold value 75A.

As described above, in the dicing apparatus 10 of the third embodiment, the division determination unit 74 determines whether or not the DAF 7 is in the undivided state on the basis of two parameters (the cut amount Δd and the signal intensity of the interference signal IS), and thus, the accuracy of determination can be improved more than in each of the embodiments described above. Further, since the interference signal IS acquired by the white interference microscope 24 is used, there is no need to add a separate device, and an increase in cost is prevented. Furthermore, the same effects as those in the dicing apparatus 10 of each of the embodiments described above can be obtained.

Fourth Embodiment

Figure 15:
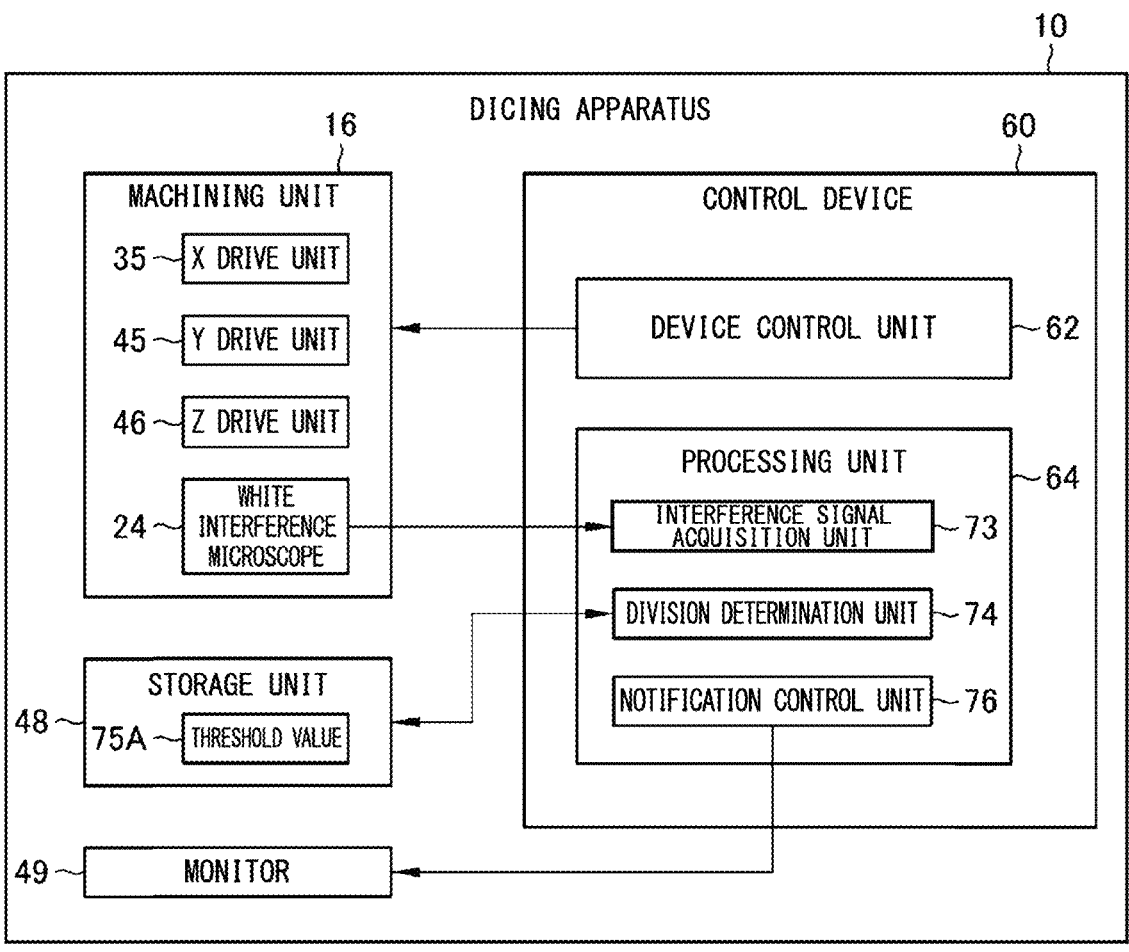
FIG. 15 is a block diagram of a dicing apparatus according to a fourth embodiment.

FIG. 15 is a block diagram of a dicing apparatus 10 according to a fourth embodiment. The dicing apparatus 10 of the fourth embodiment has basically the same configuration as the dicing apparatus 10 of the third embodiment described above, except that some functions of the processing unit 64 are omitted, and thus the same elements in function or configuration as those in each of the embodiments described above are designated by the same reference signs, and the description thereof will be omitted.

In the dicing apparatus 10 of the third embodiment, the division determination unit 74 determines whether or not the DAF 7 is in the undivided state on the basis of two parameters (the cut amount Δd and the signal intensity of the interference signal IS). On the other hand, as shown in FIG. 15, in the dicing apparatus 10 of the fourth embodiment, the processing unit 64 functions as the interference signal acquisition unit 73, the division determination unit 74, and the notification control unit 76. As a result, the division determination unit 74 of the fourth embodiment determines whether or not the DAF 7 is in the undivided state only on the basis of whether or not the signal intensity of the interference signal IS satisfies the threshold value 75A. As a result, in the flowchart of the first embodiment shown in FIG. 9 described above, the processing from step S6 to step S9 can be omitted. In the fourth embodiment, the processing of step S3 in FIG. 9 corresponds to a scanning step of the present invention.

As described above, in the dicing apparatus 10 of the fourth embodiment, the calculation of the cross-sectional profile 86 of the machined groove 19 can be omitted, and thus the processing load on the control device 60 can be reduced and the division determination unit 74 can execute the determination in a short time.

[Others]

In the first to third embodiments described above, the cross-sectional profile 86 of the machined groove 19 is obtained using the white light interferometry, but the cross-sectional profile 86 may be acquired using a known method such as a laser microscope (a laser displacement meter), a focusing method (a focus variation method), or the like.

In each of the embodiments described above, the Z drive unit 46 is driven to execute vertical scanning of the white interference microscope 24 in the Z direction, but, for example, by reciprocating the table 31 in the Z direction, the white interference microscope 24 may relatively perform the vertical scanning with respect to the surface of the workpiece W in the Z direction.

Although the each of the embodiments described above has been described using a blade dicer as an example of the dicing apparatus 10, the present invention can also be applied to a laser machining apparatus that performs laser machining, for example.

In each of the embodiments described above, in the dicing apparatus 10, it is determined whether or not the DAF 7 is in the undivided state, but a determination device separate from the dicing apparatus 10 may determine whether or not the DAF 7 is in the undivided state. Further, this determination device may be integrated with the devices for the subsequent processes (the expanding process and the pickup process) described above.

Figure 16:
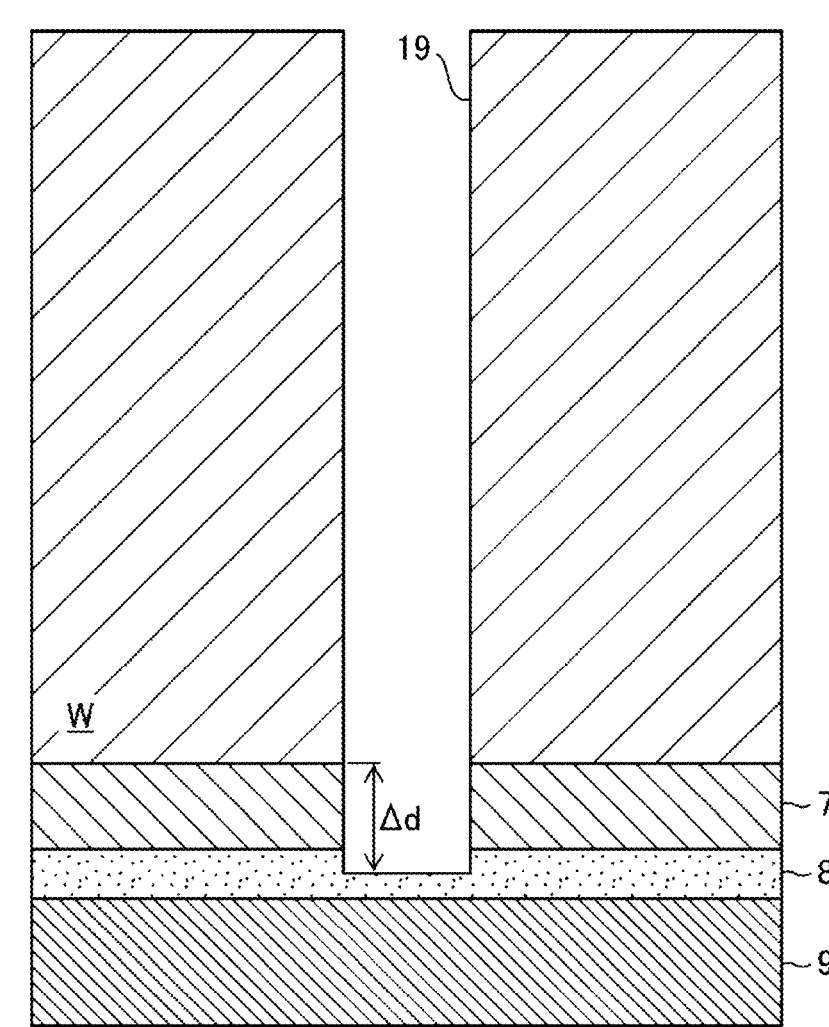
FIG. 16 is an explanatory diagram for explaining a problem in a case where a workpiece is thick.
Figure 16:
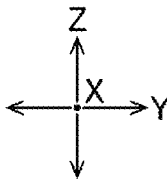
Figure 17:
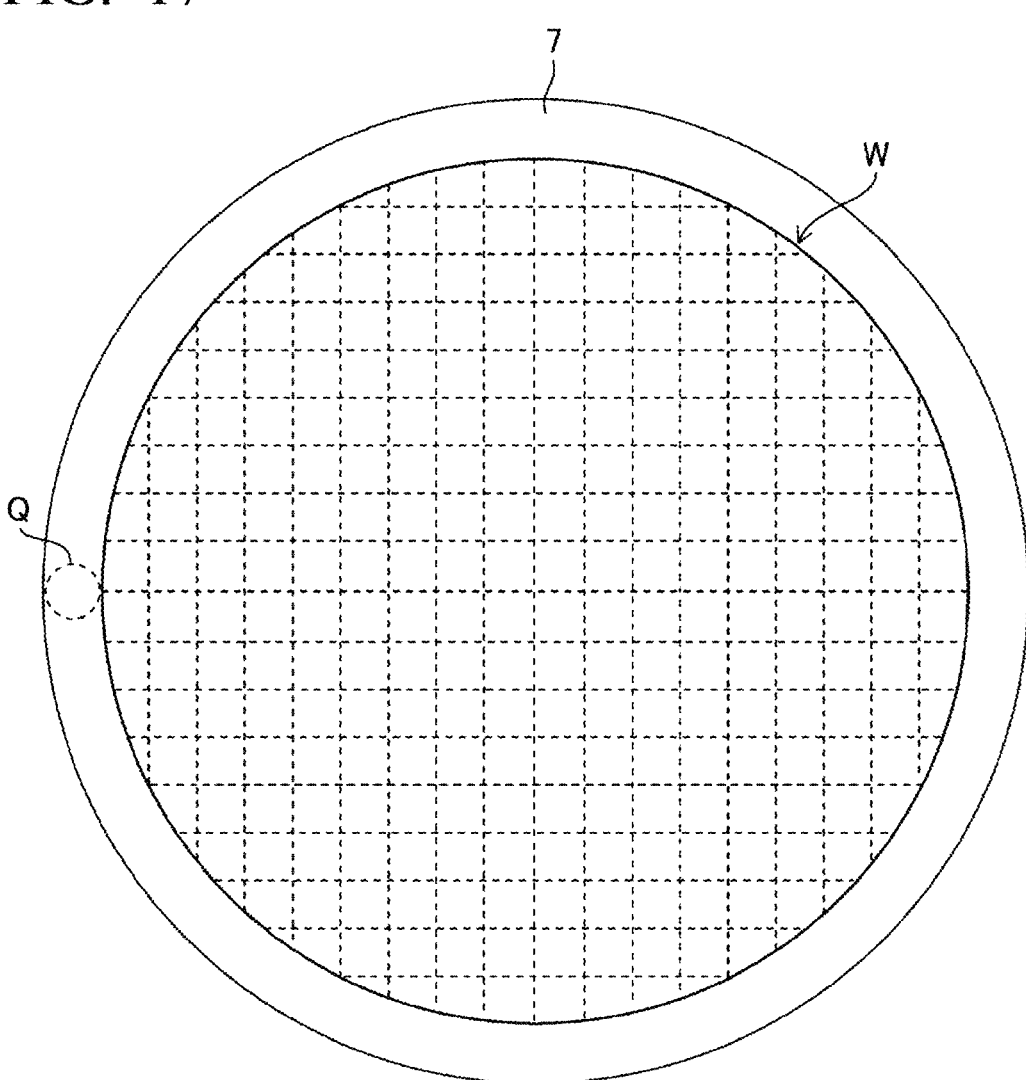
FIG. 17 is an explanatory diagram for explaining a detection point of the cut amount in a case where the workpiece is thick.
Figure 18:
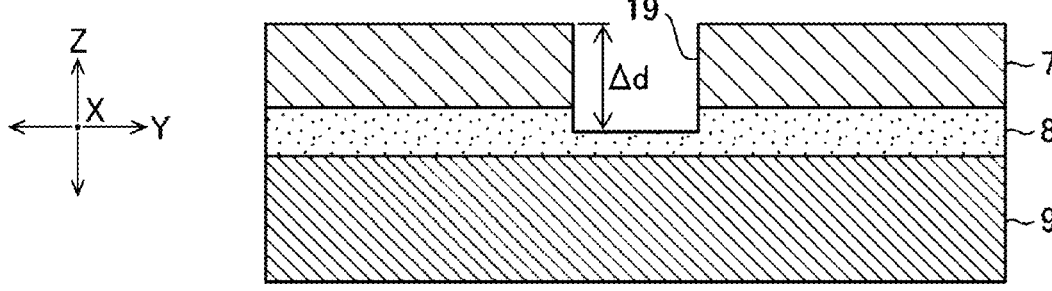
FIG. 18 is a diagram showing an example of a cross section of a machined groove at the detection point Q shown in FIG. 17.

FIG. 16 is an explanatory diagram for explaining a problem in a case where the workpiece W is thick. FIG. 17 is an explanatory diagram for explaining a detection point Q of the cut amount Δd in a case where the workpiece W is thick. FIG. 18 is a diagram showing an example of a cross section of the machined groove 19 at the detection point Q shown in FIG. 17. The same elements in function or configuration as those in each of the embodiments described above are designated by the same reference signs, and the description thereof will be omitted.

In each of the embodiments described above, the vertical scanning of the white interference microscope 24 on the surface of the workpiece W, the acquisition of the three-dimensional coordinate data group of the machined groove 19, the generation of the three-dimensional data of the machined groove 19, and the generation of the cross-sectional profile 86 of the machined groove 19 are executed, but, as shown in FIG. 16, in a case where the thickness of the workpiece W is thick, there is a possibility that the cross-sectional profile 86 with an aspect ratio necessary for detecting the cut amount Δd of the DAF 7 cannot be obtained.

Thus, as shown in FIG. 17, for example, the detection point Q of the cut amount Δd is set in a cut margin (DAF 7) outside the workpiece W, and the vertical scanning of the white interference microscope 24, the acquisition of the three-dimensional coordinate data group of the machined groove 19, the generation of the three-dimensional data of the machined groove 19, and the generation of the cross-sectional profile of the machined groove 19 may be executed on this detection point Q. As a result, as shown in FIG. 18, the cross-sectional profile 86 can be generated by directly measuring the machined groove 19 formed in the DAF 7, rather than through the workpiece W. As a result, the restriction in aspect ratio described above is eliminated, and the measurement time can be shortened by reducing the amount of vertical scanning of the white interference microscope 24 or the like.

The cut amount Δd may be detected at the detection point Q regardless of the thickness of the workpiece W.

EXPLANATION OF REFERENCES

7 Die attach film (DAF)
8 Adhesive layer
9 Dicing tape
10 Dicing apparatus
10A Housing
12 Load port
14 Transport mechanism
16 Machining unit
17 Machined groove
18 Cleaning unit
19 Machined groove
21A Blade
21B Blade
22A Spindle
22B Spindle
23 Microscope
24 White interference microscope
31 Table
31a Workpiece holding surface
32 X base
34 X guide
35 X drive unit
36 X carriage
37 Rotation unit
41 Y base
42 Y guide
43 Y carriage
44 Z carriage
45 Y drive unit
46 Z drive unit
48 Storage unit
49 Monitor

50 Housing
51 White light source
52 First beam splitter
53 Objective lens
54 Glass plate
54a Mirror
55 Second beam splitter
56 Imaging unit
60 Control device
62 Device control unit
64 Processing unit
66 Coordinate data acquisition unit
68 Three-dimensional data generation unit
68A Projection data generation unit
70 Cross-sectional profile calculation unit
72 Cut amount detection unit
73 Interference signal acquisition unit
74 Division determination unit
75 Threshold value
75A Threshold value
76 Notification control unit
78 Warning information
80 Three-dimensional coordinate data group
82 Two-dimensional plane
84 Two-dimensional projection data
86 Cross-sectional profile
CA Rotation axis
F Frame
IS Interference signal
L1 White light
L2 Measurement light
L3 Reference light
LA Interference light
W Workpiece
$\Delta d$ Cut amount
Q Detection point

What is claimed is:

1. A dicing apparatus that performs dicing of a street of a workpiece attached to a dicing tape via a die attach film and cuts the workpiece and the die attach film along the street, the apparatus comprising a processor to implement:

a cross-sectional profile acquisition unit that acquires a cross-sectional profile of a machined groove formed through the dicing;

a cut amount detection unit that detects a cut amount into the die attach film obtained through the dicing on a basis of the cross-sectional profile acquired by the cross-sectional profile acquisition unit; and a division determination unit that determines whether or not the die attach film is in an undivided state where the die attach film is not completely cut on the basis of the cut amount detected by the cut amount detection unit, wherein the cross-sectional profile acquisition unit includes:

a white interference microscope that divides white light into measurement light and reference light, irradiates the machined groove with the measurement light, images interference light between the measurement light reflected at the machined groove and the reference light reflected at a reference surface, and outputs interference signals;

a scanning mechanism that scans a surface of the workpiece in a vertical direction with the white interference microscope; and a cross-sectional profile calculation unit that calculates the cross-sectional profile on the basis of the interference signals output from the white interference microscope during scanning with the white interference microscope by the scanning mechanism, and wherein the division determination unit determines whether or not the die attach film is in the undivided state on the basis of whether or not the cut amount detected by the cut amount detection unit is less than a predetermined threshold value.

2. The dicing apparatus according to claim 1, wherein the division determination unit determines whether or not the die attach film is in the undivided state on the basis of the cut amount detected by the cut amount detection unit and a signal intensity of the interference signal obtained from a bottom portion of the machined groove among the interference signals output from the white interference microscope.

3. The dicing apparatus according to claim 1, wherein the processor further implements:

a machining unit that executes the dicing; and a machining control unit that controls the machining unit to execute the dicing on the die attach film in the undivided state in a case where the division determination unit determines that the die attach film is in the undivided state.

4. A dicing apparatus that performs dicing of a street of a workpiece attached to a dicing tape via a die attach film and cuts the workpiece and the die attach film along the street, the apparatus comprising:

a white interference microscope that divides white light into measurement light and reference light, irradiates a machined groove formed through the dicing with the measurement light, images interference light between the measurement light reflected at the machined groove and the reference light reflected at a reference surface, and outputs interference signals; and a processor to implement:

a scanning mechanism that scans a surface of the workpiece in a vertical direction with the white interference microscope;

a division determination unit that determines whether or not the die attach film is in an undivided state where the die attach film is not completely cut on a basis of a signal intensity of the interference signal obtained from a bottom surface of the machined groove among the interference signals output from the white interference microscope during scanning with the white interference microscope by the scanning mechanism; and a notification unit that notifies of warning information in a case where the division determination unit determines that the die attach film is in the undivided state.

5. A method for controlling a dicing apparatus that performs dicing of a street of a workpiece attached to a dicing tape via a die attach film and cuts the workpiece and the die attach film along the street, the method comprising applying a processor to implement:

a cross-sectional profile acquisition step of acquiring a cross-sectional profile of a machined groove formed through the dicing;

a cut amount detection step of detecting a cut amount into the die attach film obtained through the dicing on a basis of the cross-sectional profile acquired in the cross-sectional profile acquisition step; and a division determination step of determining whether or not the die attach film is in an undivided state where the die attach film is not completely cut on the basis of the cut amount detected in the cut amount detection step, wherein the cross-sectional profile acquisition step includes:

applying a white interference microscope that divides white light into measurement light and reference light, irradiates the machined groove with the measurement light, images interference light between the measurement light reflected at the machined groove and the reference light reflected at a reference surface, and outputs interference signals;

applying a scanning mechanism that scans a surface of the workpiece in a vertical direction with the white interference microscope; and calculating the cross-sectional profile on the basis of the interference signals output from the white interference microscope during scanning with the white interference microscope by the scanning mechanism, and wherein the division determination step includes determining whether or not the die attach film is in the undivided state on the basis of whether or not the cut amount detected that is less than a predetermined threshold value.

6. A method for controlling a dicing apparatus that performs dicing of a street of a workpiece attached to a dicing tape via a die attach film and cuts the workpiece and the die attach film along the street, the method comprising applying a processor to implement:

a scanning step of scanning a surface of the workpiece in a vertical direction with a white interference microscope that divides white light into measurement light and reference light, irradiates a machined groove formed through the dicing with the measurement light, images interference light between the measurement light reflected at the machined groove and the reference light reflected at a reference surface, and outputs interference signals;

a division determination step of determining whether or not the die attach film is in an undivided state where the die attach film is not completely cut on a basis of a signal intensity of the interference signal obtained from a bottom surface of the machined groove among the interference signals output from the white interference microscope during scanning with the white interference microscope; and a notification step of notifying of warning information in a case where it is determined that the die attach film is in the undivided state.

* * * * *